United States Patent
Furukawa et al.

(10) Patent No.: US 7,206,823 B2
(45) Date of Patent: Apr. 17, 2007

(54) COMPUTER SYSTEM HAVING A PLURALITY OF STORAGE NETWORKS AND METHOD FOR SETTING INFORMATION

(75) Inventors: Hiroshi Furukawa, Sagamihara (JP); Kenichi Shimooka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 10/882,615

(22) Filed: Jun. 30, 2004

(65) Prior Publication Data
US 2005/0262268 A1 Nov. 24, 2005

(30) Foreign Application Priority Data
Apr. 27, 2004 (JP) ............................. 2004-130909

(51) Int. Cl.
G06F 13/00 (2006.01)

(52) U.S. Cl. ..................................................... 709/218

(58) Field of Classification Search ..................... None
See application file for complete search history.

(56) References Cited

U.S. PATENT DOCUMENTS 6,877,044 B2  4/2005 Lo et al.
2002/0038391 A1  3/2002 Ido et al.
2003/0131182 A1  7/2003 Kumar et al.
2003/0210686 A1  11/2003 Terrell et al.
2004/0139195 A1  7/2004 Feather, Jr. et al.
2004/0139240 A1  7/2004 DiCorpo et al.
2004/0151188 A1  8/2004 Maveli et al.

FOREIGN PATENT DOCUMENTS

JP  200339225 A  8/2000

*Primary Examiner*—Robert B. Harrell
(74) *Attorney, Agent, or Firm*—Townsend and Townsend and Crew LLP

(57) ABSTRACT

In a computer system having two or more kinds of storage networks, effective information is set by use of network identifiers. An identifier acquisition unit, and a router information acquisition unit, of a management computer acquire a network identifier of a port, and information about the port connection relationship, from a computer and a protocol-conversion-type router. An identifier analyzing unit creates an identifier path from each computer to a storage device. A setting judgment unit judges whether this identifier path is independent of, or shared by, identifier paths of the other computers. According to the judgment, instead of using a network identifier of the computer, a setting execution unit uses, for information settings, an identifier of a port on the low-order side of the protocol-conversion-type router or a logical identifier that is generated.

20 Claims, 19 Drawing Sheets

| COMPUTER IDENTIFIER | LU NUMBER |
|---|---|
| WWN4 | 0, 3, 4 |
| WWN5 | 2, 5, 7, 9 |
| WWN6 | 1, 4 |
| ⋮ | ⋮ |

LU ACCESSIBILITY TABLE

| PORT NUMBER | IDENTIFIER | NETWORK TYPE | ACCESSIBILITY IDENTIFIER |
|---|---|---|---|
| PORT S1 | WWN2 | FC | NOT SET |
| PORT H1 | WWN3 | FC | NOT SET |
| ⋮ | ⋮ | ⋮ | ⋮ |

IDENTIFIER INFORMATION (b) 306

| LOW-ORDER PORT | HIGH-ORDER PORT |
|---|---|
| PORT S1 | PORT H1 |
| ⋮ | ⋮ |

INTERPORT CONNECTION INFORMATION

FIG. 10

(1) PROTOCOL-CONVERSION-TYPE ROUTER (a) 305

| PORT NUMBER | IDENTIFIER | NETWORK TYPE | ACCESSIBILITY IDENTIFIER |
|---|---|---|---|
| PORT S1 | WWN10 | FC | NOT SET |
| PORT H1 | iSCSI9 | IP | NOT SET |
| PORT H2 | iSCSI11 | IP | NOT SET |
| ⋮ | ⋮ | ⋮ | ⋮ |

IDENTIFIER INFORMATION (b) 306

| LOW-ORDER PORT | HIGH-ORDER PORT |
|---|---|
| PORT S1 | PORT H1<br>PORT H2 |
| ⋮ | ⋮ |

INTERPORT CONNECTION INFORMATION (2) PROTOCOL-CONVERSION-TYPE ROUTER (a) 305

| PORT NUMBER | IDENTIFIER | NETWORK TYPE | ACCESSIBILITY IDENTIFIER |
|---|---|---|---|
| PORT S1 | WWN8 | FC | NOT SET |
| PORT S2 | iSCSI6 | IP | NOT SET |
| PORT H1 | WWN9 | FC | NOT SET |
| PORT H2 | iSCSI7 | IP | NOT SET |
| ⋮ | ⋮ | ⋮ | ⋮ |

IDENTIFIER INFORMATION (b) 306

| LOW-ORDER PORT | HIGH-ORDER PORT |
|---|---|
| PORT S1 | PORT H1 |
| PORT S2 | PORT H1<br>PORT H2 |
| ⋮ | ⋮ |

INTERPORT CONNECTION INFORMATION

FIG. 11

| NETWORK TYPE | IDENTIFIER EXAMPLE | DATA FORMAT |
|---|---|---|
| FC NETWORK | WWN | 24 BIT NUMERIC VALUE (0123.4567.89ab.cdef, etc.) |
| IP NETWORK | iSCSI NAME | 64 BIT CHARACTER STRING (ipn.2003-11.com.xxxx:iscsi-ruter:model-yyyy:sn-zzzz, etc.) |

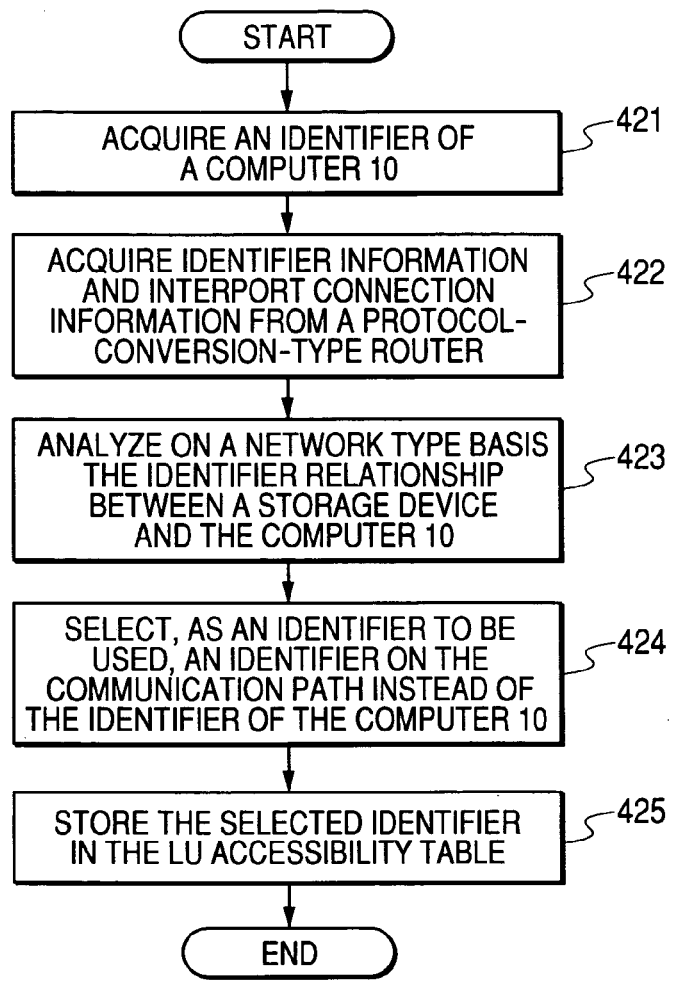
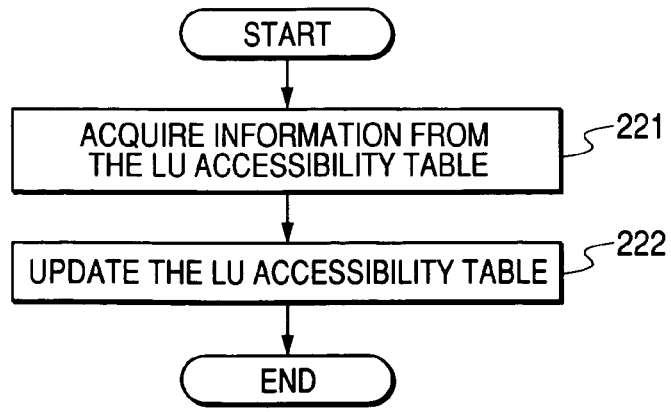

IDENTIFIER INFORMATION

| PORT NUMBER | IDENTIFIER | NETWORK TYPE | ACCESSIBILITY IDENTIFIER | LOGICAL IDENTIFIER | NETWORK TYPE |
|---|---|---|---|---|---|
| PORT S1 | WWN2 | FC | NOT SET | | |
| PORT H1 | iSCSI1 | IP | NOT SET | WWN5 | FC |
| PORT H2 | iSCSI3 | IP | NOT SET | WWN6 | FC |
| ... | ... | ... | ... | ... | ... |

COMPUTER SYSTEM HAVING A PLURALITY OF STORAGE NETWORKS AND METHOD FOR SETTING INFORMATION

CLAIM OF PRIORITY

The present application claims priority from the Japanese patent application JP2004-130909 filed on Apr. 27, 2004, the content of which is hereby incorporated by reference into this application.

BACKGROUND OF THE INVENTION

The present invention relates to a computer system in which two or more kinds of storage networks exist between a storage device and a computer, and more particularly to the technology that sets information in a computer system by use of network identifiers.

In a configuration in which a network (more specifically, a storage network) exists between a storage device and a host computer, information settings may be made between the storage device and the computer. For example, the access limit of an access from the host computer to a logical unit in the storage device is established, or the priority control QoS (Quality of Service) of I/O processing or the like is performed. In this case, an identifier of the host computer on the storage network is in general used.

For example, for a system in which a storage network using a fiber channel (FC) connects between a storage device and a host computer, a method for setting the access limit of an access from the host computer to a logical unit in the storage device is in general achieved by the technology as described in patent document 1.

According to the technology of Japanese Patent Laid-open No. 2000-339225 (patent document 1), a LUN access management table is stored in a non-volatile memory in a storage device. This table stores the correspondence of an identifier on the FC network (N_Port_Name, or WWN (World Wide Name)), by which a host computer is uniquely identified, to a logical unit number (LUN) of a logical unit in a storage device, said logical unit being permitted to be accessed from the host computer. The communication security between the storage device and the host computer is achieved by executing a filtering function in which the storage device selects only communications to which the access permission to access a logical unit in the storage device is given. To be more specific, on the basis of identifier information on the FC network that is stored in the management table, only I/O requests to which the access permission is given are selected from among I/O requests that have been issued from the host computer, and that have arrived at the logical unit. As a result, a normal access to the logical unit is ensured.

In addition, as another example, for a system in which the FC network connects between a host computer and a storage device, a method for setting QoS of I/O processing for a logical unit in a storage device of a host computer is in general achieved by the technology as described in Japanese Patent Laid-open No. 2002-108567 (patent document 2, corresponding to Published Patent Application U.S. 2002/003839A1).

According the technology described in patent document 2, a host information management table is stored in a non-volatile memory in a storage device. The host information management table includes: an identifier on the FC network (WWN), by which a host computer is uniquely identified; and a target value of I/O processing speed. Every time a command set of I/O processing is issued, QoS of I/O processing for a storage device of each host computer is guaranteed. In other words, the priority control QoS of the I/O command set arriving at a logical unit is guaranteed on the basis of identifier information on the FC network that is stored in the management table.

On the other hand, for a storage network between a storage device and a host computer, what are being formulated in recent years are the specifications of iSCSI (the specifications, the standardization of which is being promoted by IETF). The iSCSI executes I/O processing through a network using the Internet Protocol (IP), which is in general used for communications between host computers.

As is the case with the FC network that is taken as an example in the embodiments of patent documents 1 and 2, the iSCSI achieves the I/O processing between a host computer and a storage device by encapsulating in a protocol packet a command set used to access the storage device, such as a SCSI command, and then by transmitting the protocol packet on a network to communicate between the host computer and the storage device. By use of this technology, it is possible to easily achieve the wide-area access control of storage devices, which was difficult to achieve because of its cost, the limit in the communication distance, and the like, in the past. In addition, the simplification of management can also be expected by applying the mature IP network management technologies to the management.

Also to the iSCSI specifications, it is possible to apply the access limit between a host computer and a storage device, and the priority control QoS of I/O processing, which are disclosed in patent documents 1 and 2. In such a case, an identifier on the IP network is used for settings.

SUMMARY OF THE INVENTION

In the past, the single network was a mainstream in the storage network environment. However, as the use of a storage network by iSCSI is becoming popular, the storage network environment also becomes more and more complicated. For example, when configuring a storage network between locations that are far away from each other, the following method may also be applied: using a FC network inside each location while using an IP network to connect between the locations. Moreover, there also arises a case where an appropriate network is selected between the FC network and the IP network, as a network to which a host computer is connected, according to classifications such as a role of the host computer, and an OS of the host computer. In such a storage network in which two or more kinds of networks coexist, a router is placed among the networks. A command set of I/O processing is protocol-converted before the command set is transmitted to a target device.

If two or more kinds of networks coexist, a kind of identifier information on the storage device side may differ from that on the host computer side. Accordingly, information settings, which are made between the storage device and the host computer on the basis of a network identifier of the host computer as performed in the prior art, have no meaning.

An object of the present invention is to set effective information by use of network identifiers in a computer system having two or more kinds of storage networks.

Network identifiers are given to ports that are provided along an information transmission path passing through a network from a computer to a storage device. According to the present invention, a storage management function acquires information about identifiers of ports and the port connection relationship, and thereby creates an identifier path from each computer to a storage device. Then, a judgment is made as to whether this identifier path is independent of, or shared by, identifier paths of the other computers. If this identifier path is independent between the router and the storage device, instead of using a network identifier of the computer, an identifier of a port on the low-order side of the router is used for information settings. If this identifier path is shared with other computers between the router and the storage device, a logical identifier in the same format as that of a port identifier on the low-order side of the router is generated for each computer that shares the identifier path so that this logical identifier is used for information settings.

According to the present invention, in a computer system having two or more kinds of storage networks, effective information can be set by use of network identifiers.

BRIEF DESCRIPTION OF THE DRAWINGS

FIG. 6 is a diagram illustrating a configuration example of a LU accessibility table;

FIG. 7 is a diagram illustrating an example of identifier information, and connection relationship information, of a router;

FIG. 10 is a diagram illustrating a further example of identifier information, and connection relationship information, of the router;

FIG. 11 is a diagram illustrating as an example a data format of an identifier on a network type basis;

FIG. 13 is a flowchart illustrating processing steps of a first embodiment;

FIG. 14 is a diagram illustrating processing steps of a storage device according to the embodiment;

FIG. 17 is a diagram illustrating an example of identifier information of a router having a logical identifier control function;

DETAILED DESCRIPTION OF THE INVENTION

An embodiment will be described by way of example of establishing the access limit of an access from a host computer to a logical unit in a storage device. However, the present invention can also be applied to a case where other information settings are made between the storage device and the computer by use of an identifier of a network to which the host computer is connected. For example, as is the case with patent document 2, this embodiment can also be applied to the case where the priority control QoS of I/O processing for the storage device of the host computer is set.

In addition, as far as a router according to the present embodiment is concerned, each unit in a control memory is a program module which is executed by a control processor so that a function of the program module is achieved. These program modules may also be stored on a computer-readable recording medium (a flexible disk, a CD-ROM, a DVD-ROM, a semiconductor memory, etc.) Moreover, these program modules may also be transmitted through a transmission path such as a LAN and a SAN before they are loaded into the control memory. In another case, the function of each program module may also be achieved by a hardware configuration (for example, semiconductor integrated circuits such as LSI (Large Scale Integration)). Further, because program modules which are placed in a management computer have only to acquire information from other devices, and to control the devices, through a management network, these program modules may also be placed in another device so long as this is a device connected to the management network. Additionally, in this embodiment, although identifiers on a network are stored in a non-volatile memory, if a name server or the like collectively manages these identifiers, it is possible to acquire information about the identifiers from the name server.

Figure 1:
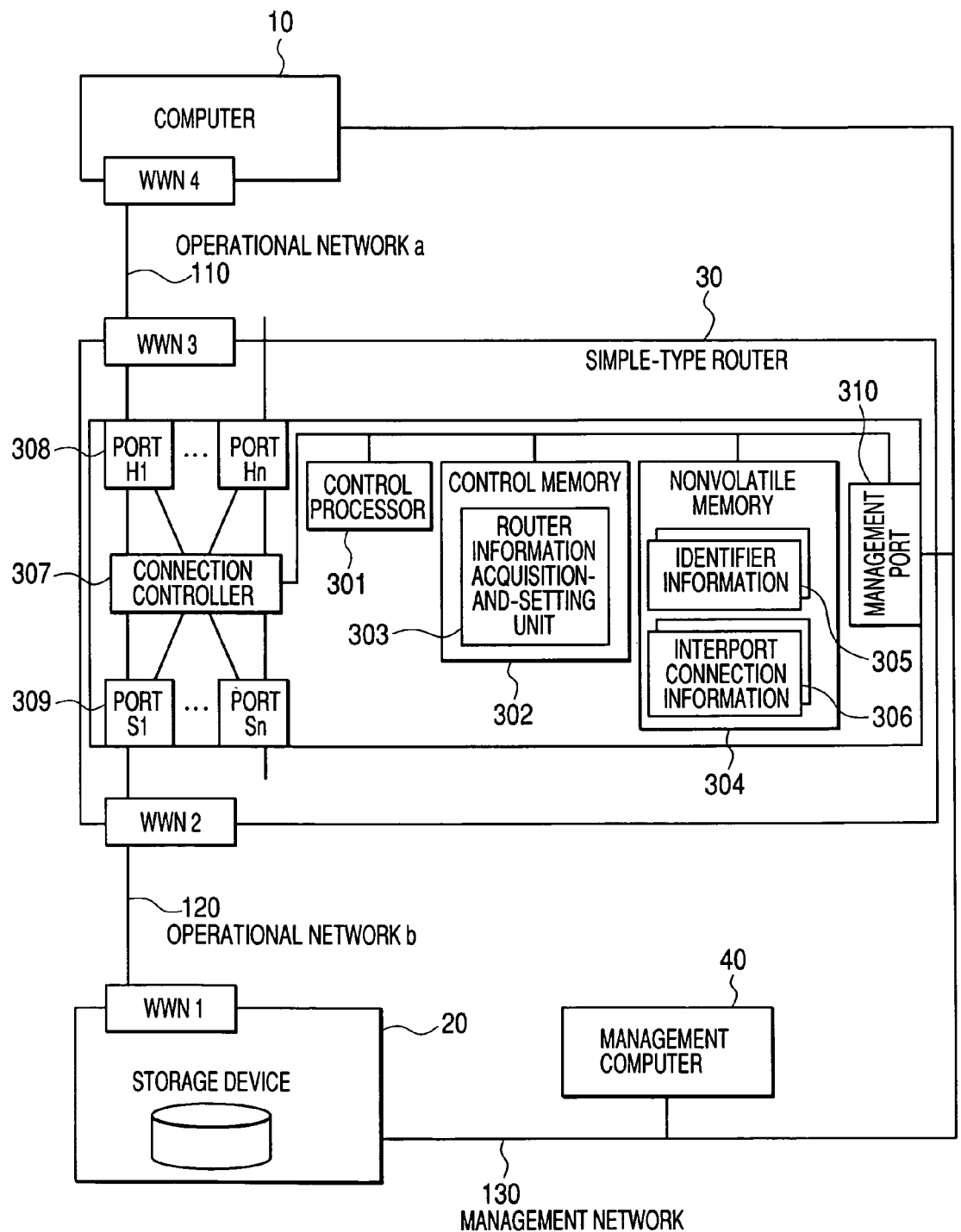
FIG. 1 is a diagram illustrating a configuration example of a computer system having a simple-type router.

FIG. 1 is a diagram illustrating a system configuration in which a storage network between a storage device and a computer used as a host computer is formed of a single network. Reference numeral 10 denotes a computer used as a host computer; reference numeral 20 denotes a storage device; reference numeral 30 denotes a simple-type router for relaying a network between the computer 10 and the storage device 20; and reference numeral 40 denotes a management computer for managing each device. Reference numeral 110 denotes an operational network a that connects between the computer 10 and the simple-type router 30; and reference numeral 120 denotes an operational network b that connects between the storage device 20 and the simple-type router 30. Here, the operational network a 110 and the operational network b 120 belong to the same kind of network. Reference numeral 130 denotes a management network that connects among the computer 10, the storage device 20, and the simple-type router 30, and the management computer 40, and that is used to collect management information so as to control them.

Figure 2:
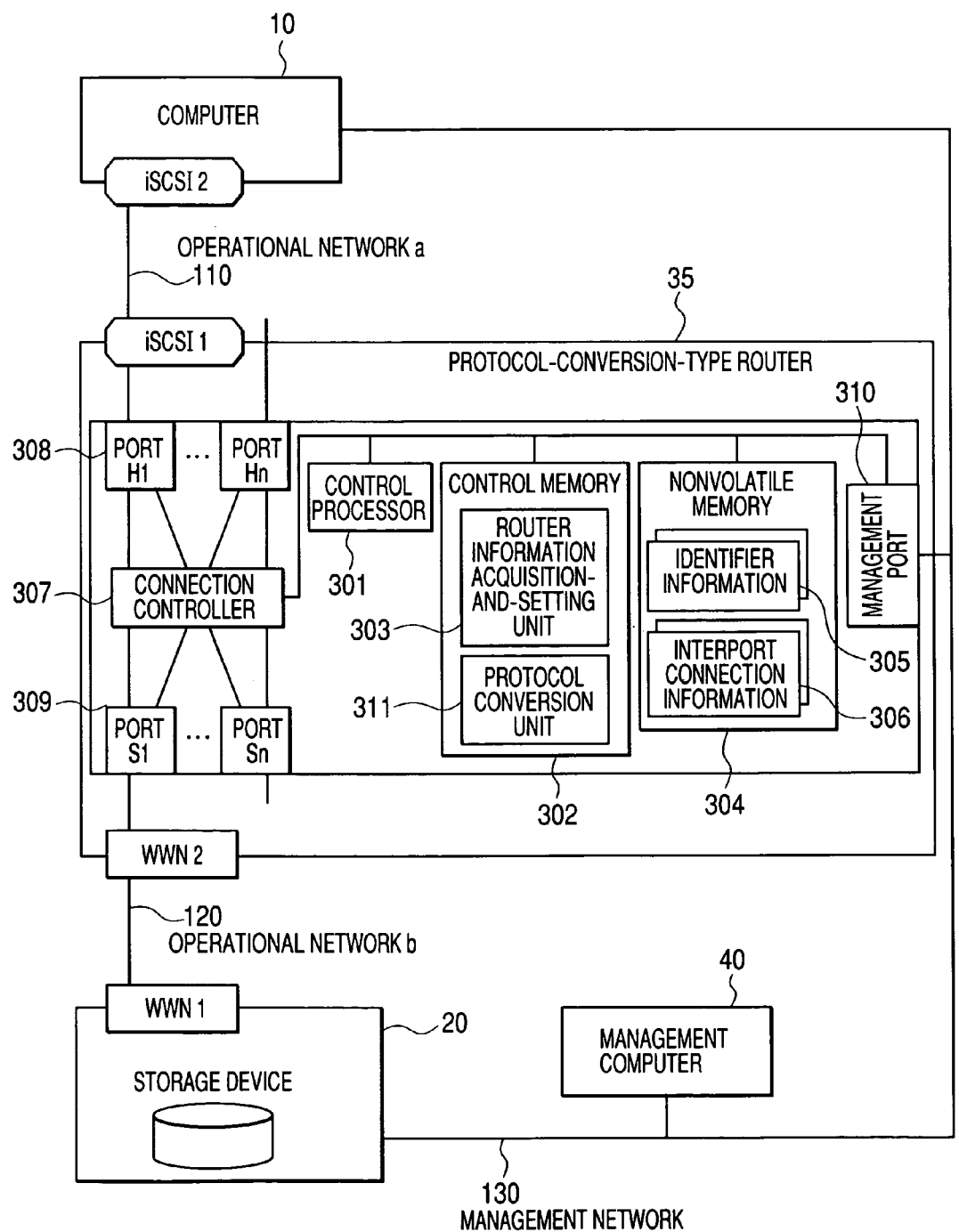
FIG. 2 is a diagram illustrating a configuration example of a computer system having a protocol-conversion-type router.

FIG. 2 is a diagram illustrating a system configuration in which a storage network between the storage device and the computer is formed of two or more kinds of networks. FIG. 2 is different from FIG. 1 in that a network type of the operational network a 110 differs from that of the operational network b 120, and that a device that relays both of the operational networks is a protocol-conversion-type router 35.

Figure 3:
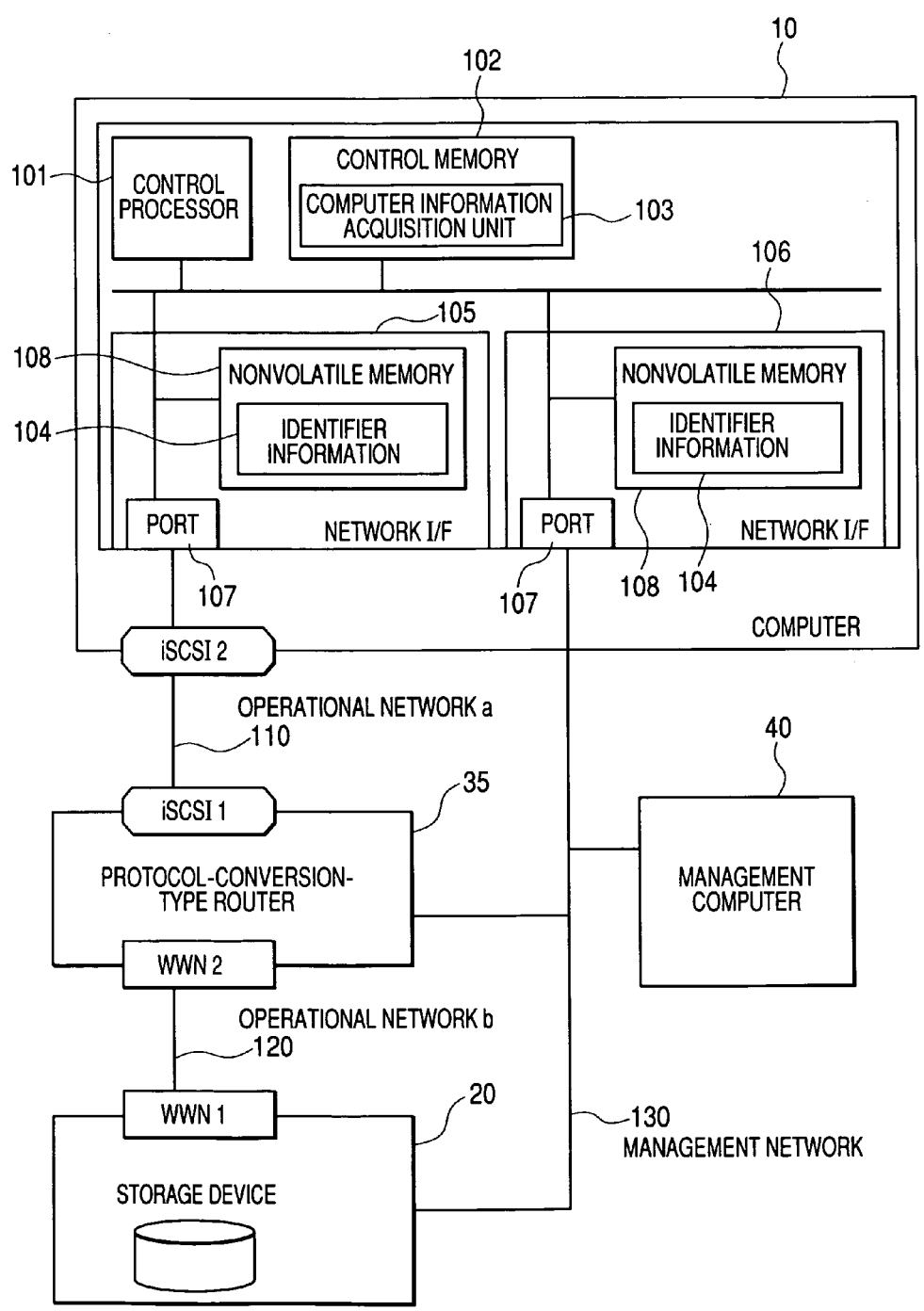
FIG. 3 is a block diagram illustrating a hardware configuration example of the computer 10.

FIG. 3 is a diagram illustrating a hardware configuration of the computer 10. The computer 10 includes: a control processor 101 for controlling the total operation in a centralized manner; a control memory 102 for storing a program to be executed by the control processor 101; a network I/F 105 for controlling an interface with the operational network a 110; and a network I/F 106 for controlling an interface with the management network 130.

Each of the network I/Fs 105 and 106 includes: a port 107 that functions as an I/F with the network; and a non-volatile memory 108 capable of holding information even when the power of the device is turned off. The non-volatile memory 108 stores, for example, identifier information 104 that is unique in the network to which the port 107 is connected.

A computer information acquisition unit 103 which is stored in the control memory 102 is a program that extracts the identifier information 104 from the non-volatile memory 108, and that then transmits the identifier information 104 to the management computer 40 through the management network 130.

Figure 4:
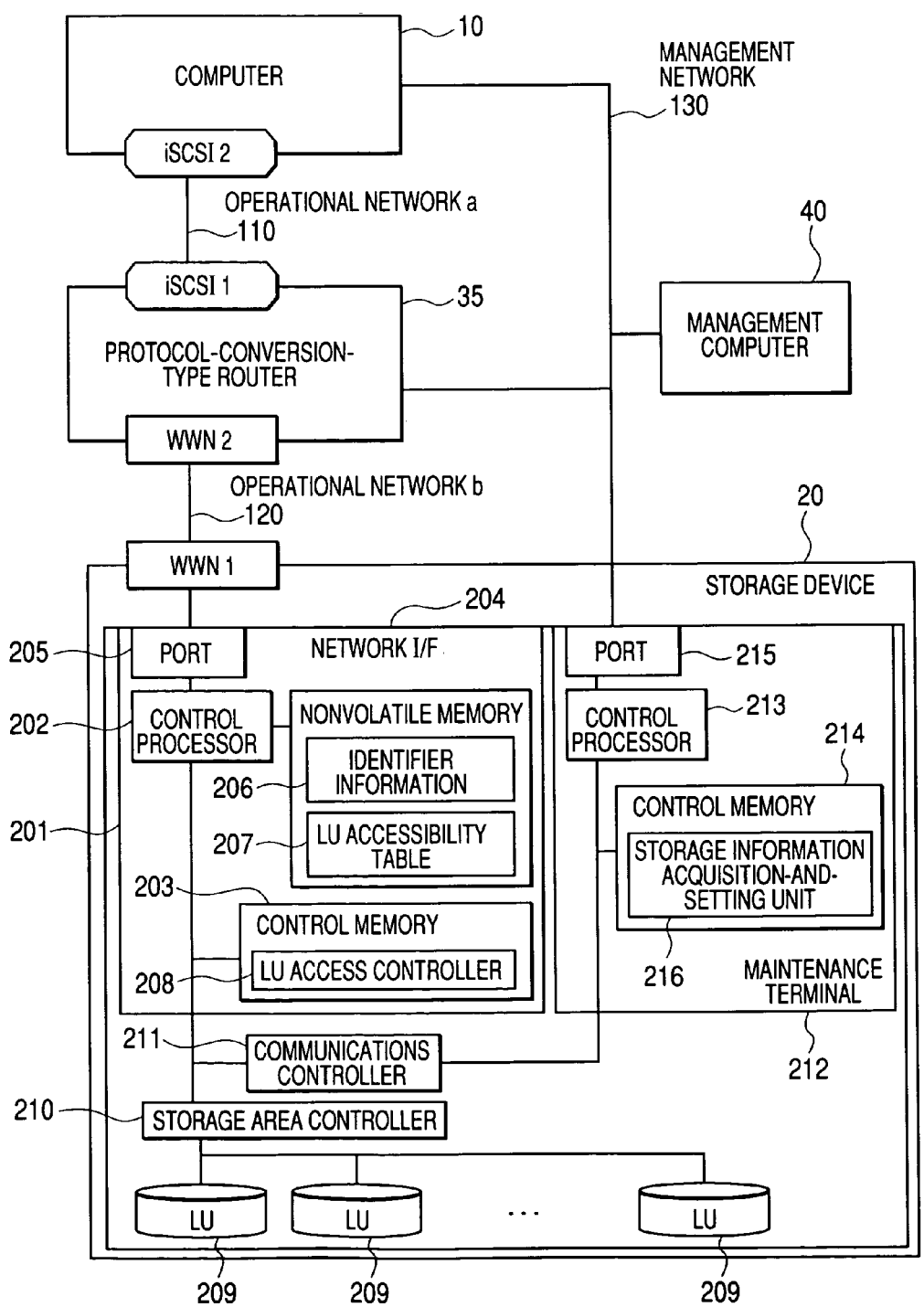
FIG. 4 is a block diagram illustrating a hardware configuration example of a storage device.

FIG. 4 is a diagram illustrating a hardware configuration of the storage device 20. The storage device 20 includes: a network I/F 201 for controlling an interface with the operational network b 120; a plurality of logical units (LU) 209 that are storage areas; a storage area controller 210 for controlling the LUs 209 according to a received I/O command; a maintenance terminal 212 for managing a device failure occurring in the storage device; and a communications controller 211 that allows a maintenance terminal 212 to control communications with the storage device.

A disk array device is connected to the storage area controller 210. A disk constituting a disk array device is divided into logical blocks; and each of the divided blocks can be set at a different RAID level. This block is called a RAID group. Further, this RAID group is logically divided into areas, each of which is an access unit of SCSI. This area is called a LU (Logical Unit). A LUN (Logical Unit Number) is given to each LU.

The network I/F 201 includes as a hardware configuration: a control processor 202 for controlling the total operation in a centralized manner; a control memory 203 for storing a program to be executed by the control processor 202; a non-volatile memory 204 capable of holding data even after the control processor 202 stops its operation; and a port 205 for controlling communications with the operational network b 120.

The maintenance terminal 212 includes as a hardware configuration: a control processor 213 for controlling the total operation in a centralized manner; a control memory 214 for storing a program to be executed by the control processor 213; and a port 215 for controlling communications with the management network 130.

The non-volatile memory 204 stores identifier information 206, which is unique in the network to which the port 205 is connected, and a LU accessibility table 207. The LU accessibility table 207 is a table indicating the correspondence of the computer 10 to the LU 209 that is permitted to be accessed.

A storage information acquisition-and-setting unit 216, which is stored in the control memory 214 of the maintenance terminal 212, is a program that extracts the identifier information 206 from the non-volatile memory 204, and that then transmits the identifier information 206 to the management computer 40 through the management network 130. In addition, according to an instruction from the management computer 40, the storage information acquisition-and-setting unit 216 updates the identifier information 206 and stores information in the LU accessibility table 207.

The LU access controller 208, which is stored in the control memory 203, refers to the LU accessibility table 207, and thereby controls an access to the LU 209 made by the computer 10.

FIG. 6 is a diagram illustrating an example of the LU accessibility table 207. The LU accessibility table 207 shows the correspondence of a computer identifier for identifying the computer 10 to LU numbers each indicating the LU 209, in the storage device 20, that can be accessed by the computer 10. In the example shown in FIG. 6, the computer 10 having an identifier of WWN4 is permitted to access only LUs indicated by LU numbers 0, 3, 4. Incidentally, although a storage area to be controlled by the storage area controller 210 can be configured on a LU unit basis as described above, the storage area to be controlled may also be configured on a logical volume unit basis, on a physical volume unit basis, or on a RAID group unit basis. Incidentally, the access control that uses the accessibility table is described in detail in patent document 1, and therefore its detailed description will be omitted in this specification.

FIG. 1 is a diagram illustrating a hardware configuration of the simple-type router 30. The simple-type router 30 includes a control processor 301, a control memory 302, a non-volatile memory 304, ports H1 through Hn 308 (they are generically called ports H), and ports S1 through Sn 309 (they are generically called ports S). The control processor 301 controls the total operation in a centralized manner. The control memory 302 stores a program that is executed by the control processor 301. The non-volatile memory 304 holds data even after the control processor 301 stops its operation. The ports H 308 control the interface with the operational network a 110, that is to say, the network on the computer side. The ports S 309 control the interface with the operational network b 120, that is to say, the network on the side of the storage device 20. It is to be noted that there are in general a plurality of ports H 308 and a plurality of ports S 309. The connection controller 307 connects the ports H 308 to the ports S 309, and controls port connections on the basis of interport connection information that will be described later. The management port 310 controls the interface with the management network 130.

The non-volatile memory 304 stores: identifier information 305 of the ports H 308 and of the ports S 309, which are used on the network; and interport connection information 306 about the connections of the ports H 308 to the ports S 309.

Figure 8:
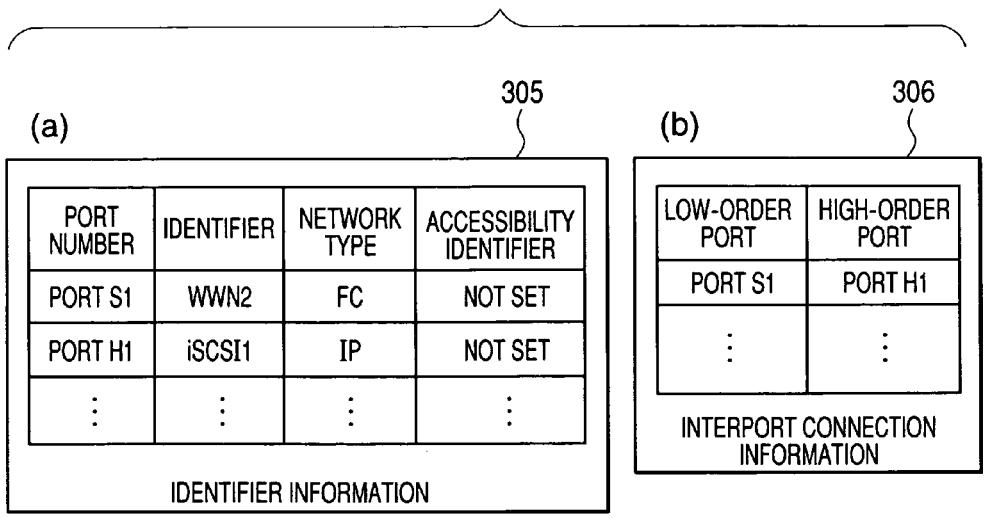
FIG. 8 is a diagram illustrating another example of identifier information, and connection relationship information, of the router.
Figure 9:
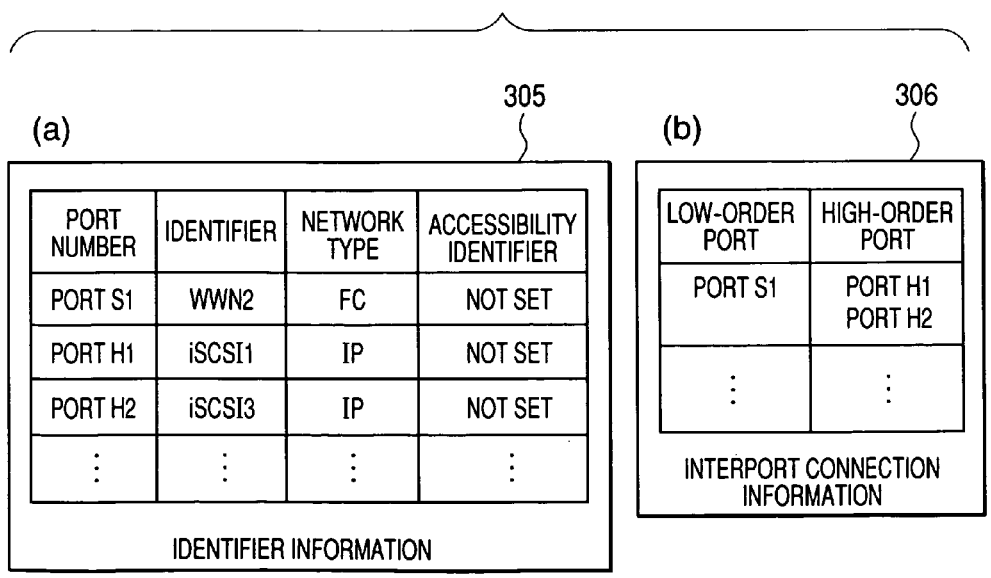
FIG. 9 is a diagram illustrating still another example of identifier information, and connection relationship information, of the router.

FIGS. 7 through 10 illustrates examples of how data of the identifier information 305 and data of the interport connection information 306 are configured. Entries of the identifier information 305 include a port number indicating one of the ports H 308 or a port number indicating one of the ports S 309, an identifier in the network, a network type, and an accessibility identifier. The network type is a type of a network that is assigned to the port. The accessibility identifier is an identifier of a network that is permitted to access a port having a corresponding port number. Entries of the interport connection information 306 show the connection relationship between a low-order port and a high-order port. Examples of the connection relationships between a low-order port and a high-order port include the one-to-one relationship as shown in FIGS. 7 and 8; the one-to-many relationship as shown in FIG. 9; and a combination of the on-to-one relationship and the one-to-many relationship as shown in FIG. 10. Incidentally, FIGS. 7 through 10 illustrate only the examples, and therefore, their formats do not matter so long as the connection relationship between the ports and identifier information about a network of each port can be recognized.

A router information acquisition-and-setting unit 303, which is stored in the control memory 302, is a program that acquires and sets the identifier information 305, and the interport connection information 306, in the simple-type router 30 according to an instruction from the management computer 40. In addition, when the interport connection information 306 is changed, the router information acquisition-and-setting unit 303 transmits the changed information to the connection controller 307.

FIG. 2 is a diagram illustrating a hardware configuration of the protocol-conversion-type router 35. The protocol-conversion-type router 35 is different from the simple-type router 30 in that since a network type of the operational network a 110 differs from that of the operational network b 120, the control memory 302 stores a protocol conversion unit 311. The protocol conversion unit 311 is a program that performs protocol conversion processing between both of the operational networks. Incidentally, in the identifier information 305 of the network, a network type of the port S 309 is different from that of the port H 308.

FIG. 11 illustrates, by way of example, identifier data formats that differ depending on a network type. Here, an FC network and an IP network are shown as examples. Thus, if their network types differ from each other, the identifier data formats are often incompatible. This means that among different kinds of networks, even if an identifier of a destination network can be acquired, it is not possible to recognize even what the identifier means.

Figure 5:
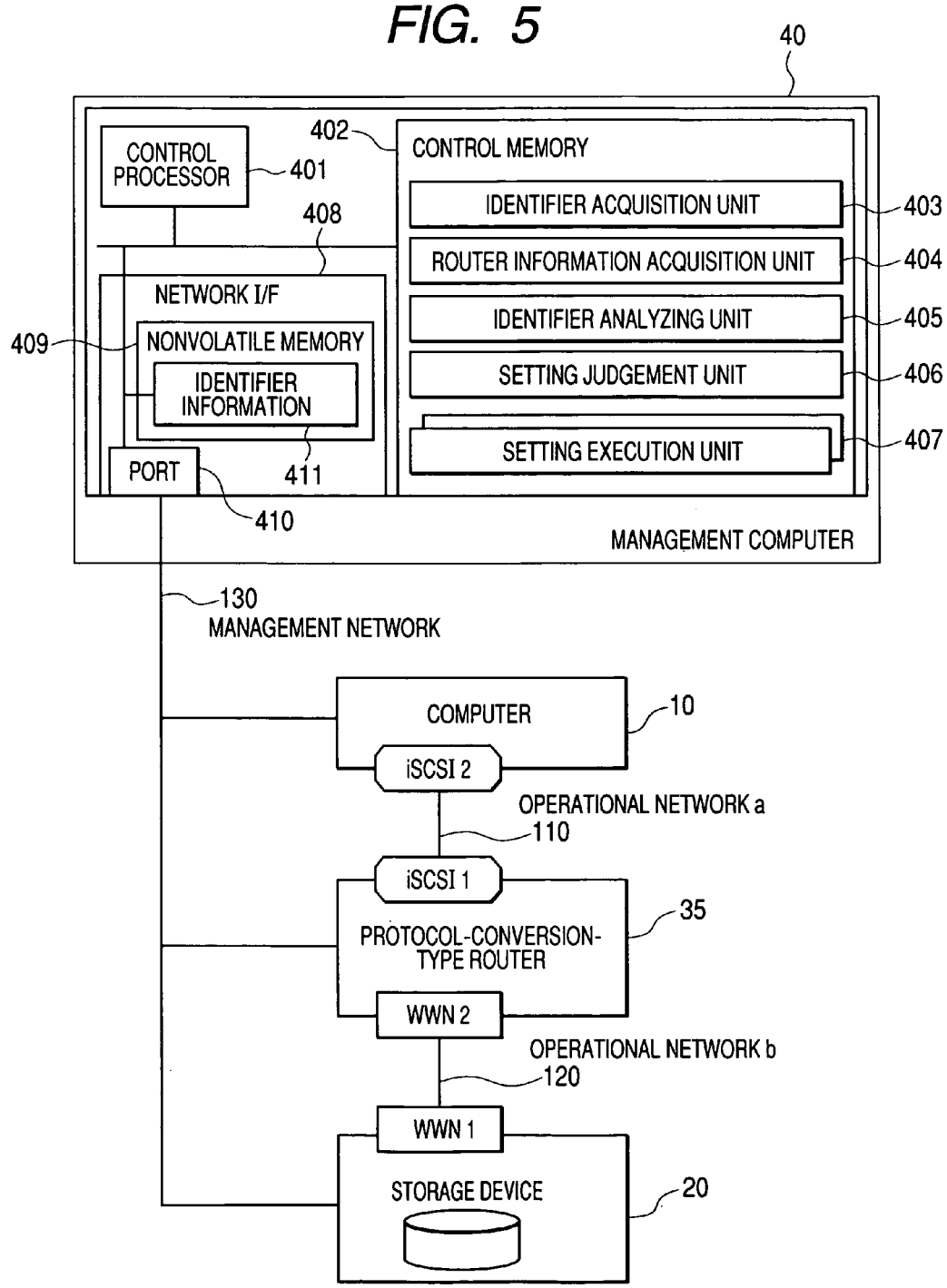
FIG. 5 is a block diagram illustrating a hardware configuration example of a management computer.

FIG. 5 is a diagram illustrating a hardware configuration of the management computer 40. The management computer 40 includes: a control processor 401 for controlling the total operation in a centralized manner; a control memory 402 for storing a program to be executed by the control processor 401; and a network I/F 408 for controlling an interface with the management network 130.

Each network I/F 408 includes: a port 410 for controlling communications with the network; and a non-volatile memory 409 capable of storing information even when the power of the device is turned off. The non-volatile memory 409 stores, for example, identifier information 411 that is unique in the management network 130 to which the port 410 is connected.

The control memory 402 stores programs such as an identifier acquisition unit 403, a router information acquisition unit 404, an identifier-analyzing unit 405, a setting judgment unit 406, and a setting execution unit 407.

The identifier acquisition unit 403 acquires, through the management network 130, identifier information 104 and 206 about the operational network a 110 connected to the computer 10 and the operational network b 120 connected to the storage device 20.

The router information acquisition unit 404 acquires, through the management network 130, the identifier information 305 used on the network, and the interport connection information 306, about the ports H 308 and the ports S 309 included in the simple-type router 30 and the protocol-conversion-type router 35.

The identifier analyzing unit 405 analyzes the identifier information on a network type basis with reference to the information acquired by the identifier acquisition unit 403 and the router information acquisition unit 404.

On the basis of the result of the analysis by the identifier analyzing unit 405, the setting judgment unit 406 determines a point at which identifier settings should be performed for the storage device, and then executes the processing of generating a set value required for the settings. After that, the setting execution unit 407 is called to perform the identifier settings on the basis of the result of the determination.

Figure 12:
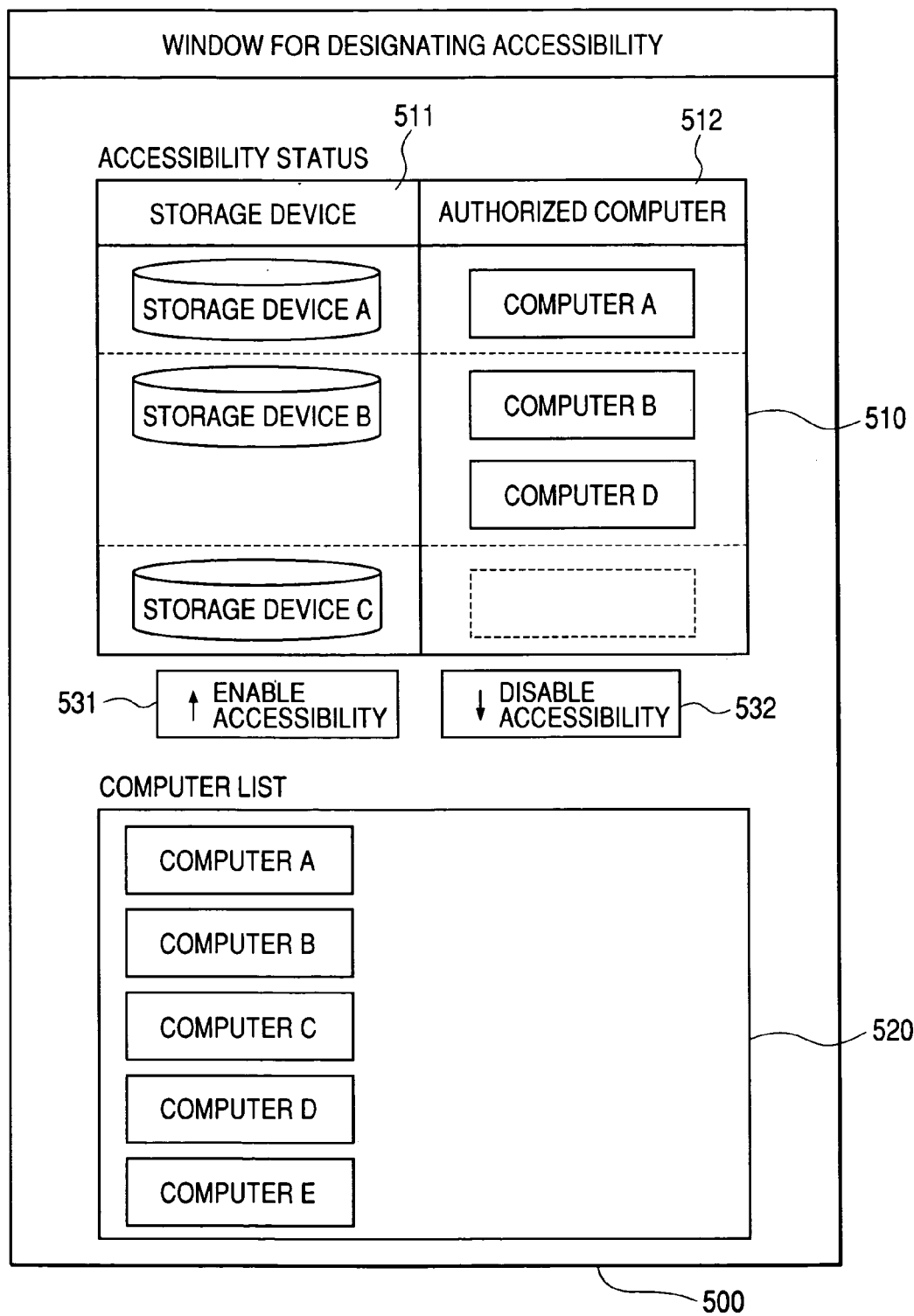
FIG. 12 is a diagram illustrating an example of a window for specifying the access permission.

FIG. 12 is a diagram illustrating an example of a window that is displayed on a display unit by the management computer 40. This window is used to set the access limit of an access from the computer 10 to the storage device 20. An administrator specifies the access permission according to this guide window; for example, the administrator gives the computer 10 the access permission to access a storage device.

The window for designating accessibility 500 is largely divided into two specification areas. Reference numeral 510 denotes an area showing a state in which the access permission is currently specified. This area includes an area 511 indicating all storage devices that can be identified through the management network 130, and an area 512 indicating the computer 10 to which the access permission to access the storage device is given. The administrator can select, through mouse operations, or the like, metaphors individually expressing a storage device and the computer 10 in the respective areas 511, 512.

Reference numeral 520 denotes an area showing a list of computers to which the access permission to access the storage device can be given. The administrator can select, through mouse operations, or the like, a metaphor individually expressing a computer.

Reference numeral 531 denotes a button used to add the computer 10 that is selected in the area 520, as a computer to which the access permission to access the storage device selected in the area 511 is given. Reference numeral 532 denotes a button used to delete a computer that is selected in the area 512, from the computers to which the access permission to access the storage device is given.

In the example shown in FIG. 12, there are three storage devices A through C, and five computers A through D. The permission to access the storage device A is given to the computer A, and the permission to access the storage device B is given to the computers B and D. On the other hand, there is no computer to which the permission to access the storage device C is given.

In this state, for example, if the administrator wants to remove the permission to access the storage device B, which is given to the computer D, the administrator can specify it by selecting a metaphor of the computer D in the area 512, and then by pressing the button 532. In addition, if the administrator wants to give the computer C the permission to access the storage device C, the administrator can specify it by selecting a metaphor of the storage device C in the area 511 and a metaphor of the computer C in the area 520, and then by pressing the button 531. As described above, by use of this window, it becomes possible to specify the permission to access a storage device, which is given to the computer 10.

(1) First Embodiment

To begin with, what will be described here is a case where a network type of the operational network a 110 is the same as that of the operational network b 120, and where the access limit of an access from the computer 10 to a logical unit in the storage device 20 is established. Here, it is assumed that the operational network a 110 and the operational network b 120 are formed of a FC network, which uses WWN as its identifier, and that each port is provided with the identifier as shown in show FIG. 1. To be more specific, the storage device 20 is provided with WWN1; the port S 309 of the simple-type router 30 is provided with WWN2; the port H 308 is provided with WWN3; and the computer 10 is provided with WWN4. In this case, the identifier information 305, and the interport connection information 306, of the simple-type router 30 are set as shown in FIG. 7.

In the conventional technologies that are disclosed in patent document 1 and the like, the identifier acquisition unit 403 of the management computer 40 acquires the identifier WWN4 of the computer 10, and then set the information as a computer identifier of the LUN accessibility table 207. This is because a network type of the operational network a 110 is the same as that of the operational network b 120, it is possible to identify the identifier WWN4 of the computer 10 from the storage device 20. To be more specific, if a network type of the operational network a 110 is the same as that of the operational network b 120, it is not necessary to judge network types of the networks between the storage device 20 and the computer 10 on the basis of information acquired from the router information acquisition unit 404.

On the other hand, what will be described next is a case where a network type of the operational network a 110 differs from that of the operational network b 120, in other words, different kinds of storage networks coexist, and where the access limit of an access from the computer 10 to a logical unit in the storage device 20 is established. Here, the operational network a 110 is formed of the IP network, and the operational network b 120 is formed of the FC network. As their identifier, iSCSI names are used on the IP network side, and WWN names are used on the FC network side. Each port is provided with the identifier as shown in show FIG. 2. To be more specific, the storage device 20 is provided with WWN1; the port S 309 of the protocol-conversion-type router 35 is provided with WWN2; the port H 308 is provided with iSCSI1; and the computer 10 is provided with iSCSI2. In this case, the identifier information 305, and the interport connection information 306, of the protocol-conversion-type router 35 are set as shown in FIG. 8.

FIG. 13 is a flowchart illustrating processing steps of the management computer 40 which establishes the access limit of an access to a logical unit in a state in which the identifiers are provided as described above. To begin with, the management computer 40 displays the window 500 to allow the administrator to specify the access permission to access the computer 10.

Next, the identifier acquisition unit 403 of the management computer 40 acquires the identifier iSCSI2 of the specified computer 10 (step 421).

Here, it is assumed that the information that has been acquired in the step 421 is simply set as a computer identifier of the LUN accessibility table 207. Since a data format of the information that is set differs from that of WWN which is the identifier that can be identified in the operational network b 120 connecting to the storage device 20, the access limit of an access from the computer 10 to a LU in the storage device 20 does not function normally.

For this reason, in order to solve this problem, after acquiring the identifier iSCSI2 of the computer 10, the router information acquisition unit 404 of the management computer 40 acquires the identifier information 305 and the interport connection information 306 from the protocol-conversion-type router 35 (step 422).

Next, the identifier analyzing unit 405 analyzes on a network type basis the port identifier relationship between the storage device 20 and the computer 10, and then creates an identifier path, that is to say, a sequence of identifiers, from the computer 10 to the storage device 20 (step 423). Here, the identifier path means an information transmission path between the port of the storage device 20 and the port of the computer 10, which is expressed using a sequence of identifiers on a network basis.

For example, in the case of the configuration shown in FIG. 2, as a result of the analysis, the operational networks include two kinds of networks (the operational network a 110 of the IP network and the operational network b 120 of the FC network) forming the one-to-one connection relationship. This connection relationship has identifier paths iSCSI2-iSCSI1 and WWN2-WWN1 on a network basis.

On the basis of the result of the analysis, in the example shown in FIG. 2, the setting judgment unit 406 judges that instead of iSCSI2 which is an identifier of the computer 10, the identifier WWN2 should be used as an identifier of the LUN accessibility table 207 (step 424).

The reason why the judgment has been made in this manner is that WWN2 is the identifier that can be identified in the operational network b 120, and that WWN2 is identifier information assigned to a port that relays only communications from the computer 10.

Lastly, the setting judgment unit 406 calls the setting execution unit 407. The setting execution unit 407 calls the storage information acquisition-and-setting unit 216 through the management network 130 so that WWN2 is stored in the LUN accessibility table 207 as a computer identifier (step 425).

FIG. 14 is a diagram illustrating the processing steps of the storage information acquisition-and-setting unit 216. These processing steps are performed in the processing in the step 425. The storage information acquisition-and-setting unit 216 acquires information about the LU accessibility table 207 through the communication controller 211 according to an instruction (step 221).

Next, the storage information acquisition-and-setting unit 216 renews the information about the LU accessibility table 207 according to an instruction, and then writes the latest information about the LU accessibility table 207 to the non-volatile memory 204 to update the LU accessibility table 207 (step 222).

For example, in the case of the first embodiment, the update is performed so that instead of the computer identifier iSCSI stored in the LU accessibility table 207, WWN2 is used. This causes the LU access controller 208 of the storage device 20 to refer to the updated LU accessibility table 207 at the time of executing an I/O command to access a LU. As a result, it becomes possible to achieve the access control of accessing the LU of the storage device 20 using the right identifier.

According to the processing steps described above, even if storage networks include different kinds of networks, it becomes possible to set the access limit of an access from the computer to a logical unit in the storage device.

(2) Second Embodiment

Next, another embodiment will be described by taking as an example a case where the access limit of an access from the computer 10 to a logical unit in the storage device 20 is established in a network in which a network router, or the like, combines different kinds of storage networks and accordingly one port corresponds to a plurality of ports. Incidentally, as is the case with the first embodiment, the second embodiment targets all information settings made between the computer 10 and the storage device 20 by use of an identifier of a network to which the computer 10 is connected.

Figure 15:
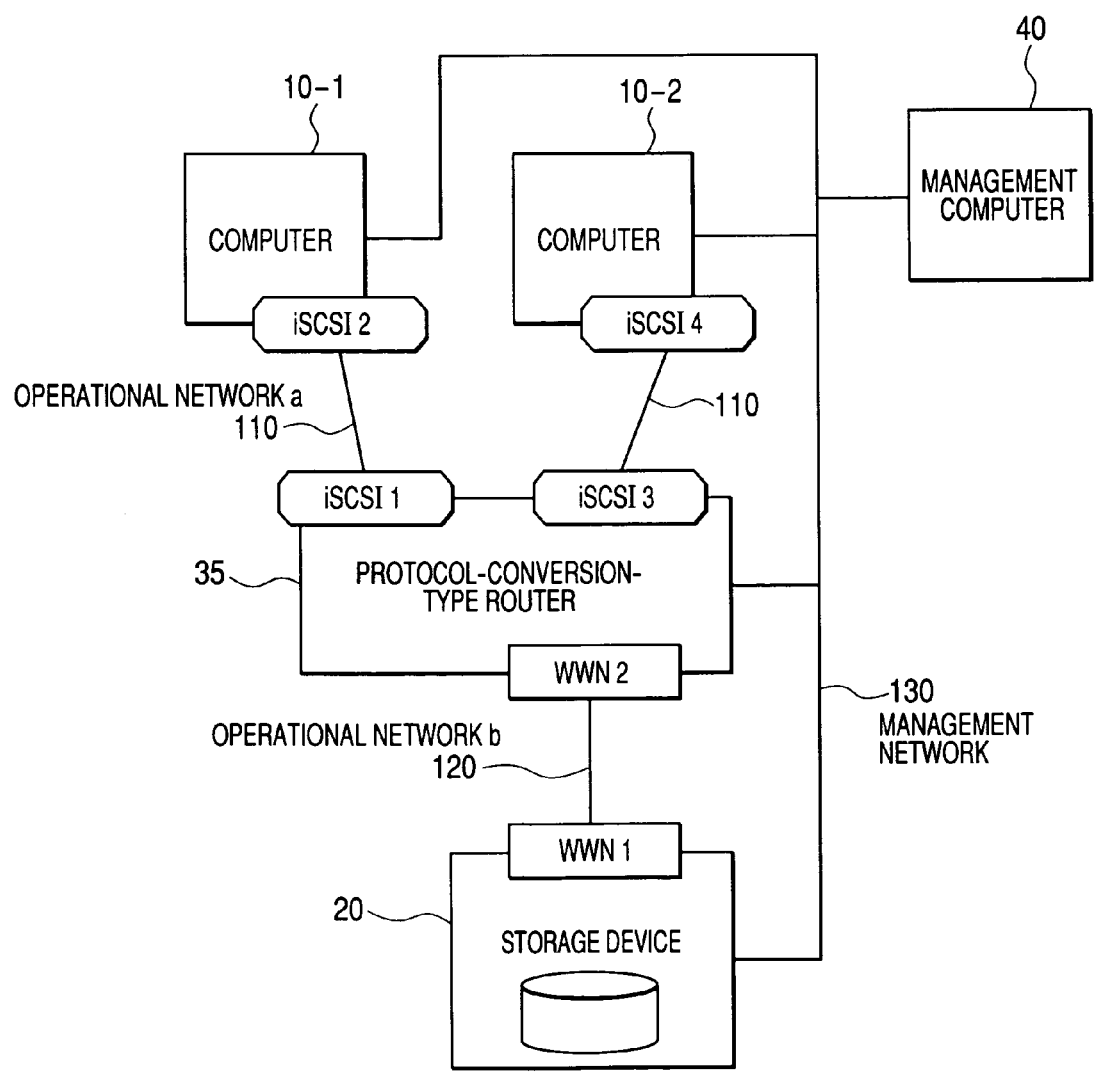
FIG. 15 is a diagram illustrating an example of a computer system having a plurality of computers 10 and two or more kinds of storage networks.

FIG. 15 is a diagram illustrating a configuration example in which a storage network between the computer 10 and the storage device 20 includes two or more kinds of networks, and in which there are a plurality of computers 10 that are connected to one port of the storage device. As a specific example, what is assumed here is a configuration in which there are two computers 10, and a network router links two networks, and the linked network is connected to one network leading to the storage device 20.

This configuration is the same as that shown in FIG. 2 except that a computer 10-2 is added to a computer 10-1, and that the computer 10-2 is connected to the protocol-conversion-type router 35 through an operational network a 110 and is also connected to the management network 130. In addition, a hardware configuration of the computer 10-2 is also the same as that of the computer 10-1, that is to say, the hardware configuration of the computer 10. Therefore, description of the configuration will be omitted.

What will be described here is processing of establishing the access limit of an access from the computer 10 to a logical unit in the storage device 20 in the case where a network type of the operational network a 110 differs from that of the operational network b 120, and where as shown in FIG. 15, there are a plurality of computers that are connected to one port of the storage device 20.

In this example, the operational network a 110 is formed of the IP network, and the operational network b 120 is formed of the FC network; and as their identifier, iSCSI names are used on the IP network side, and WWN names are used on the FC network side. Each port is provided with the identifier as shown in the figure. To be more specific, the storage device 20 is provided with WWN1; the port S 309 of the protocol-conversion-type router 35 is provided with WWN2; the port H 308 is provided with iSCSI1 and iSCSI3; the computer 10-1 is provided with iSCSI2; and the computer 10-2 is provided with iSCSI4.

In this case, the identifier information 305, and the interport connection information 306, of the protocol-conversion-type router 35 are set as shown in FIG. 9. As understood from the interport connection information 306, information indicating that two ports (port H1 and port H2) are connected to one port (port S1) is held.

In this state of settings, the identifier acquisition unit 403 of the management computer 40 first acquires the identifiers iSCSI2 and iSCSI4 of the computers 10-1 and 10-2 which are specified (step 421).

Simply setting the information, which has been acquired in the step 421, as computer identifiers of the LU accessibility table 207 is meaningless because the access limit of an access from the computers 10-1 and 10-2 to a LU in the storage device 20 does not function normally as described in the first embodiment.

Accordingly, in order to solve this problem, after acquiring the identifiers iSCSI2 and iSCSI4 of the computers 10, the router information acquisition unit 404 of the management computer 40 acquires the identifier information 305 and the interport connection information 306 from the protocol-conversion-type router 35 (step 422).

Next, the identifier analyzing unit 405 analyzes on a network type basis the port identifier paths existing among the storage device 20 and the computers 10-1 and 10-2, and then creates identifier paths, that is to say, sequences of identifiers, from each of the computers 10 to the storage device 20 (step 423).

For example, in the case of the configuration shown in FIG. 15, as a result of the analysis, the operational networks include two kinds of networks (the operational network a 110 of the IP network and the operational network b 120 of the FC network) forming the one-to-two connection relationship. The connection between the storage device 20 and the computer 10-1 has port identifier paths iSCSI2-iSCSI1 and WWN2-WWN1 on a network basis. In a similar manner, the connection between the storage device 20 and the computer 10-2 has port identifier paths iSCSI4-iSCSI3 and WWN2-WWN1 on a network basis.

Here, it is assumed that WWN2 is set as a computer identifier of the LUN accessibility table 207. As is the case with the first embodiment, WWN2 is the identifier which can be identified in the operational network b 120 that is connected to the storage device 20, and is also the identifier on both of the paths between the storage device 20 and the computers 10.

However, as understood from the above-mentioned result of the analysis, WWN2 is an identifier shared by both of the connection between the storage device 20 and the computer 10-1 and the connection between the storage device 20 and the computer 10-2. Therefore, it is not possible to set the access limit of an access to a logical unit in the storage device by individually specifying each computer 10. For example, by use of WWN2, it is not possible to make such settings that the access permission is given to the connection between the storage device 20 and the computer 10-1 while the access permission is not given to the connection between the storage device 20 and the computer 10-2. For this reason, on the basis of this analysis result, the setting judgment unit 406 judges as follows.

Figure 16:
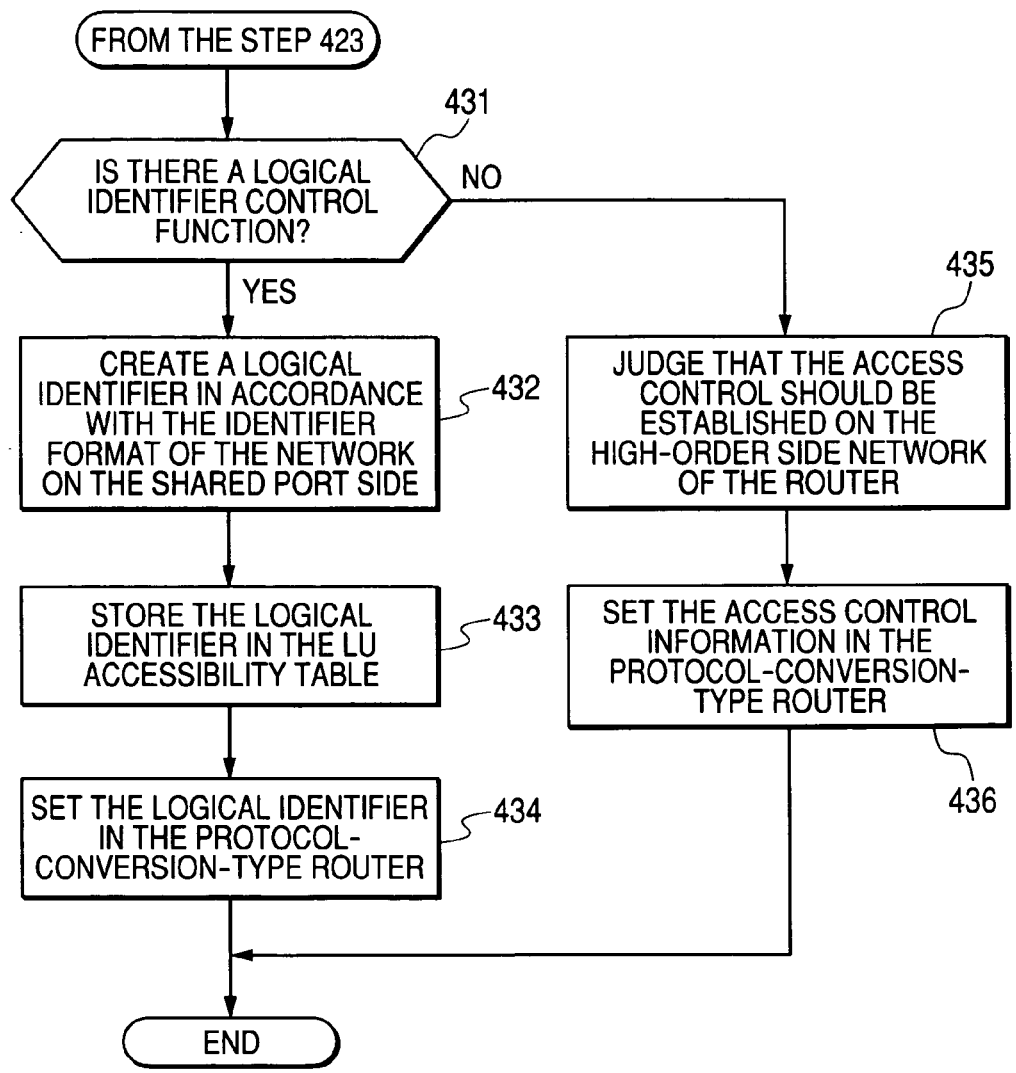
FIG. 16 is a flowchart illustrating processing steps of a second embodiment.

FIG. 16 is a flowchart illustrating processing steps of the management computer 40 that sets the access limit of an access to a logical unit in the second embodiment. To begin with, the setting judgment unit 406 judges whether or not the protocol-conversion-type router 35 has a logical identifier control function (step 431).

The logical identifier control function is processing of communicating with the storage device 20 by assigning a logical identifier to one port (for example, the port H 308) between a high-order port and a low-order port existing in the protocol-conversion-type router 35 in the same data format (for example, a data format of WWN) as that of a network identifier of the other corresponding port (for example, port S 309), and then by using this logical identifier. In other words, in the example shown in FIG. 15, this is a function of transmitting information received by the port H 308 to the port S 309 through a virtual port having a logical identifier in the WWN format.

The existence of this function can be judged by checking whether or not the identifier information 305 includes information as shown in the figure. To be more specific, in addition to data items of the identifier information 305 shown in FIGS. 7 and 8, it is possible to judge the existence of this function by checking whether or not there are information about a logical identifier and its network type. However, how to judge the existence of this function is not limited to this method. If the judgment can be achieved by another method, any judging method may be used.

Figure 18:
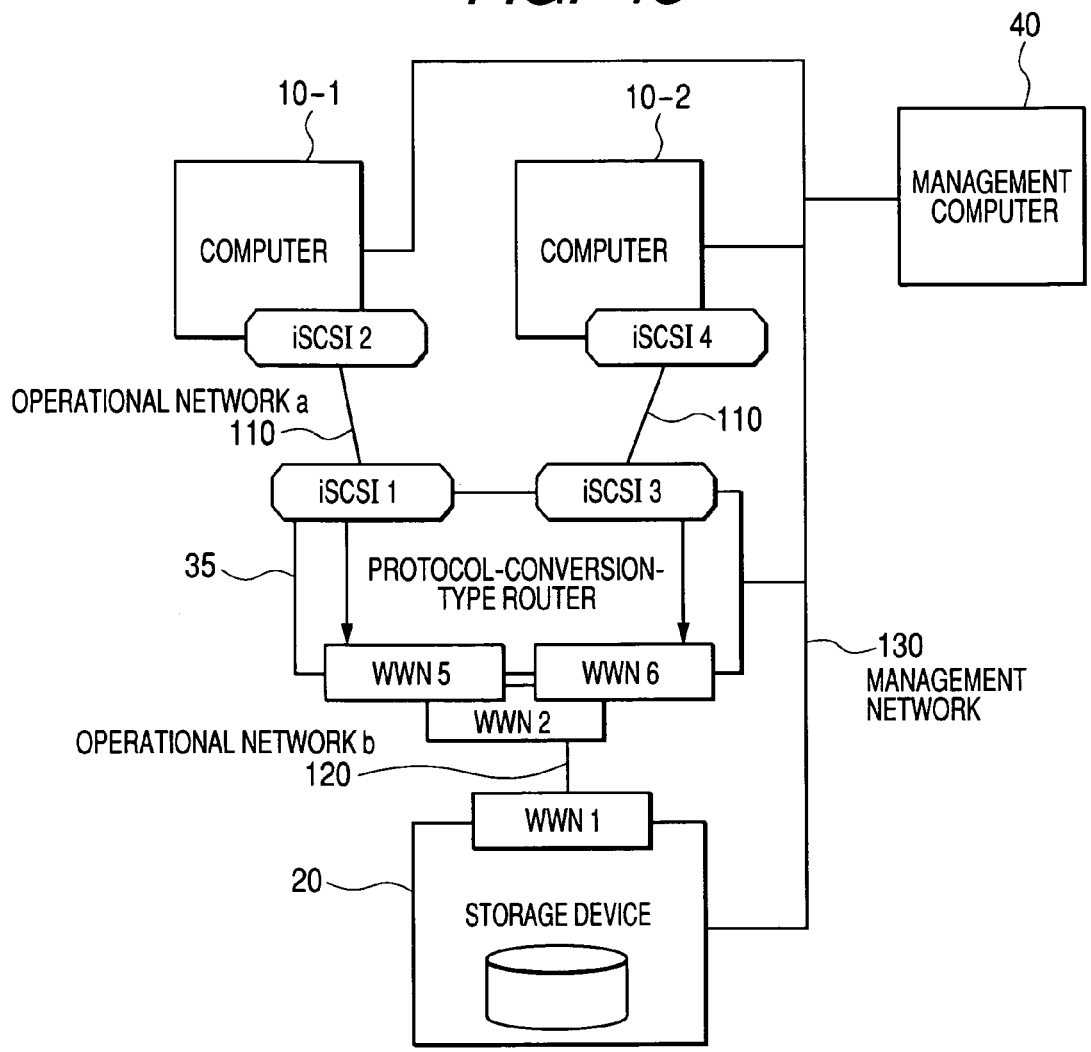
FIG. 18 is a diagram illustrating an example of a computer system in which logical identifiers are applied.

If it is judged in the step 431 that there is the logical identifier control function, the setting judgment unit 406 creates logical identifiers, in the WWN format of the operational network b 120, on the port H1 having the identifier of iSCSI1 and on the port H2 having the identifier of iSCSI3 (step 432). Here, as shown in FIG. 18, it is assumed that WWN5 is created on the port H1 having the identifier of iSCSI1, and that WWN6 is created on the port H2 having the identifier of iSCSI3.

Next, the setting execution unit 407 calls the storage information acquisition-and-setting unit 216 so that WWN5 and WWN6 are transmitted to the storage device 20 and are then stored as computer identifiers of the LUN accessibility table 207 (step 433). For example, if the access permission is given to only the computer 10-1, only WWN5 is stored. On the other hand, if the access permission is given to only the computer 10-2, only WWN6 is stored. If the access permission is given to both of them, WWN5 and WWN6 are stored. If no access permission is given to both of them, nothing is stored for the settings. Next, the setting execution unit 407 calls the router information acquisition-and-setting unit 303 through the management network 130 so that as logical identifiers of the identifier information 305, WWN5 and WWN6, corresponding to the port H1 and the port H2 respectively, are transmitted to the protocol-conversion-type router 35, and then WWN5 and WWN6 are set in the protocol-conversion-type router 35 (step 434).

On the other hand, if it is judged in the step 431 that there is no logical identifier control function, the setting judgment unit 406 judges that on the operational network b 120 side, it is not possible to set the access limit of an access to a logical unit in the storage device by individually specifying each computer 10. Accordingly, the setting judgment unit 406 judges that on the operational network a 110 side, the access limit should be established on the connection between the storage device 20 and the computer 10-1 and on the connection between the storage device 20 and the computer 10-2 (step 435).

More specifically, the above-mentioned access limit uses a network access limit function of the operational network a 110, which is a standard function of the protocol-conversion-type router 35. This is achieved by a filtering function in which the port H 308 of the protocol-conversion-type router 35 permits only communications from an identifier of a specific operational network a 110. For example, in the configuration example shown in FIG. 15, if the access control desired is such that the port H1 having the identifier of iSCSI1 accepts only communications with the computer 10-1, iSCSI2 is set as an accessibility identifier. In addition, if the access control desired is such that the port H2 having the identifier of iSCSI3 accepts only communications with the computer 10-2, iSCSI4 is set as an accessibility identifier. This function makes it possible to give, on operational network a 110 side, the access permission of an access to the storage device 20.

After that, the setting judgment unit 407 calls the router information acquisition-and-setting unit 303 through the management network 130 so that an accessibility identifier of the identifier information 305 is set (step 436).

Figure 19:
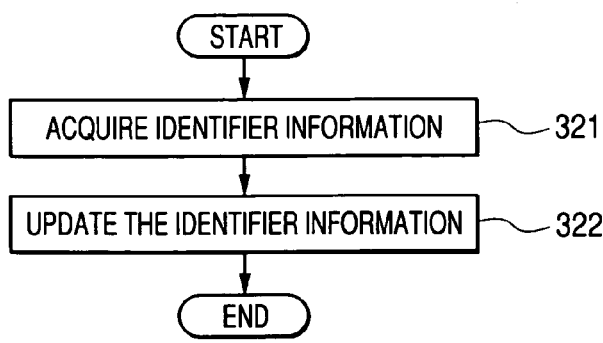
FIG. 19 is a flowchart illustrating processing steps of a router according to the embodiment.

FIG. 19 is a diagram illustrating the processing steps of the router information acquisition-and-setting unit 303. These processing steps are performed in the processing in the steps 434 and 436. The router information acquisition-and-setting unit 303 acquires the identifier information 305 on the basis of an instruction (step 321).

Next, the router information acquisition-and-setting unit 303 updates the identifier information 305, which has been acquired according to the instruction, and then writes the updated identifier information 305 to the non-volatile memory 304 (step 322).

For example, in the second embodiment, if it is judged that there is the logical identifier control function, an update is made so that as a logical identifier included in the identifier information 305, WWN5 corresponding to the ports H1 and WWN6 corresponding to the ports H2 are stored. In addition, if it is judged that there is no logical identifier control function, an update is made so that as an accessibility identifier of the identifier information 305 shown in FIG. 10, iSCSI2 corresponding the port H1 and iSCSI4 corresponding to the port H2 are stored.

As a result, the identifier information 305 is updated. The connection controller 307 of the protocol-conversion-type router 35 then refers to the identifier information 305 when relaying communications from the port H 308 to the port S 309. Accordingly, the communication relaying control by use of valid identifiers becomes possible.

As a result of the processing described above, even if storage networks include different kinds of networks, and even if the connection relationship is so complicated that the connection relationship of the network forms the many-to-many relationship, it becomes possible to set the access limit of an access from the computer to a logical unit in the storage device.

(3) Third Embodiment

Next, a third embodiment will be described by taking as an example a case where the access limit of an access from the computer 10 to a logical unit in the storage device is establish in a network configuration in which complicated protocol conversion of different kinds of storage networks is performed through a plurality of network routers. Incidentally, as is the case with the first and second embodiments, the third embodiment targets all information settings made between the computer 10 and the storage device 20 by use of an identifier of a network to which the computer 10 is connected.

Figure 20:
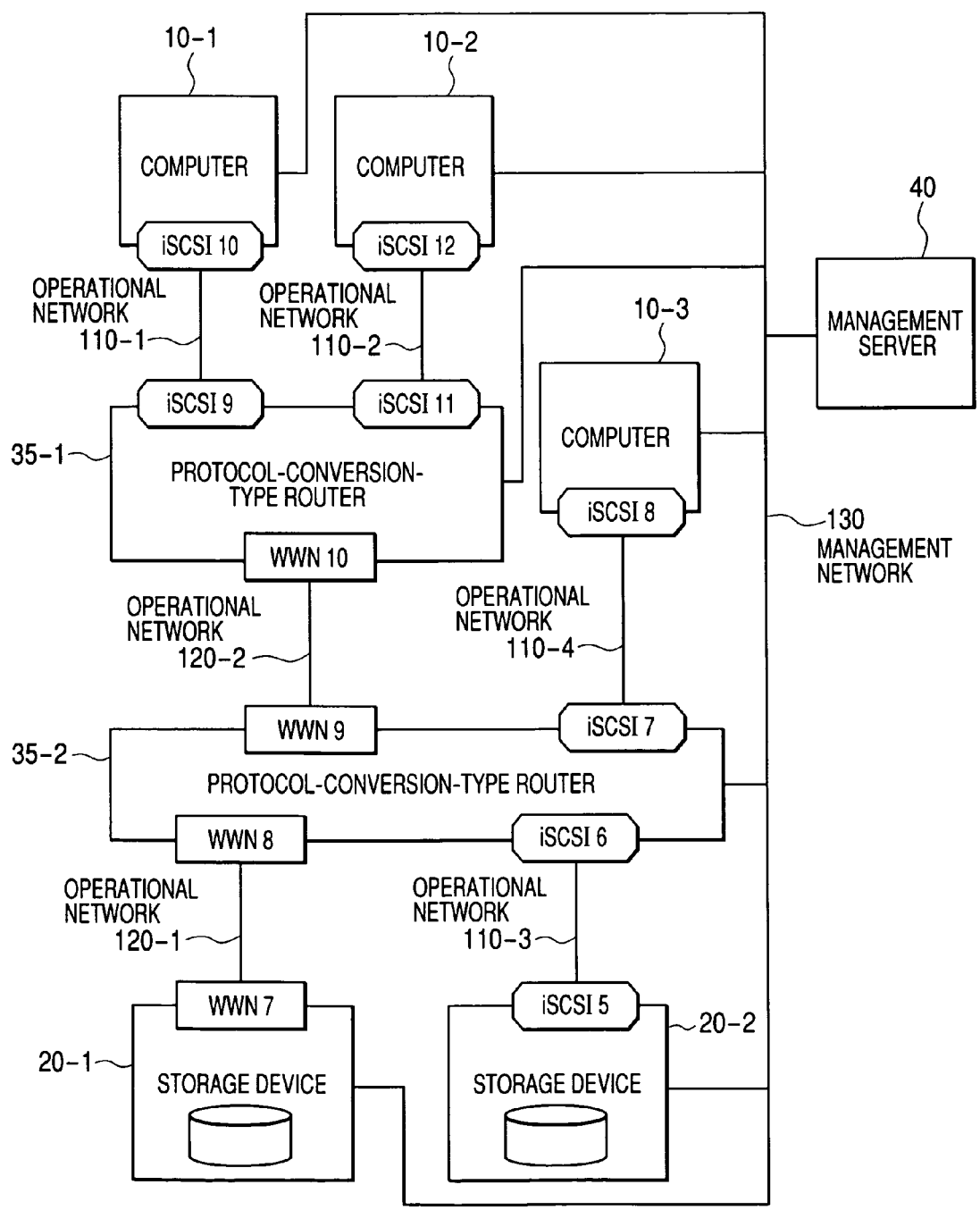
FIG. 20 is a diagram illustrating an example of a computer system having a plurality of computers 10, two or more kinds of storage networks, and routers placed in a multistage manner.

FIG. 20 is a diagram illustrating an example of a system in which there are the plurality of storage devices 20 and the plurality of computers 10, which are connected through two or more kinds of storage networks. Here, network routers connecting the computers 10 to the storage devices 20 form a multistage configuration.

As illustrated in the figure, the system, which is shown as the example, comprises three computers 10, two storage devices 20, two protocol-conversion-type routers 35, and a network that connects among the management computer 40 and the devices. The system has the following operational networks: an operational network 120-1 between the storage device 20-1 and the protocol-conversion-type router 35-2; an operational network 120-2 between the protocol-conversion-type router 35-2 and the protocol-conversion-type router 35-1; an operational network 110-1 between the protocol-conversion-type router 35-1 and the computer 10-1; an operational network 110-2 between the protocol-conversion-type router 35-1 and the computer 10-2; an operational network 110-3 between the storage device 20-2 and the protocol-conversion-type router 35-2; and an operational network 110-4 between the protocol-conversion-type router 35-2 and the computer 10-3. In this system, the operational networks 120-1, 120-2 are the FC networks; and the operational networks 110-1, 110-2, 110-3, and 110-4 are the IP networks. It is to be noted that because hardware configurations of the computers 10, the storage devices 20, and the protocol-conversion-type routers 35 are the same as those described in the first embodiment, their description will be omitted.

In addition, it is intended that the access permission to access the storage device 20-1 is given to the computer 10-1, and the access permission to access the storage device 20-2 is given to the computers 10-2 and 10-3.

In such a situation, as their identifiers, iSCSI names are used on the IP network side, and WWN names are used on the FC network side. Each port is provided with the identifier as shown in show FIG. 20. To be more specific, the storage device 20-1 is provided with WWN7; the storage device 20-2 is provided with iSCSI5; the protocol-conversion-type router 35-2 is provided with WWN8 and iSCSI6 on the port S 309 side, and is provided with WWN9 and iSCSI7 on the port H 308 side; the protocol-conversion-type router 35-1 is provided with WWN10 on the port S 309 side, and is provided with iSCSI9 and iSCSI11 on the port H 308 side; the computer 10-1 is provided with iSCSI10; the computer 10-2 is provided with iSCSI12; and the computer 10-3 is provided with iSCSI8. Moreover, the identifier information 305 and the interport connection information 306, which are possessed by the protocol-conversion-type routers 35-1 and 35-2, are set as shown in FIG. 10.

Here, as is the case with the first and second embodiments, processing of establishing the access limit of an access from the computer 10 to a logical unit in the storage device 20 will be described.

In this state of settings, the identifier acquisition unit 403 of the management computer 40 first acquires the identifiers iSCSI10, iSCSI12, and iSCSI8 of the computers 10-1, 10-2, and 10-3 which are specified (step 421).

Next, the router information acquisition unit 404 of the management computer 40 acquires the identifier information 305 and the interport connection information 306 that are possessed by the protocol-conversion-type routers 35-1 and 35-2 (step 422).

Next, the identifier analyzing unit 405 analyzes, on a network type basis, the port identifier relationship existing between the storage device and the computer, where there is the connection relationship; more specifically, the identifier analyzing unit 405 analyzes the port identifier relationship existing between the storage device 20-1 and the computer 10-1, between the storage device 20-2 and the computer 10-2, and between the storage device 20-2 and the computer 10-3. Then, the identifier analyzing unit 405 thereby creates identifier paths, that is to say, sequences of identifiers, from the computer 10 to the storage device 20 (step 423).

For example, in the case of the configuration shown in FIG. 20, identifier paths created between the storage device 20-1 and the computer 10-1 are iSCSI10-iSCSI9, WWN10-WWN7. Identifier paths created between the storage device 20-2 and the computer 10-2 are iSCSI12-iSCSI11, WWN10-WWN9, iSCSI16-iSCSI5. An identifier path created between the storage device 20-2 and the computer 10-3 is iSCSI8-iSCSI5.

On the basis of the result of the analysis, for each connection between the storage device 20 and the computer 10, the setting judgment unit 406 makes a judgment as described below.

Figure 21A:
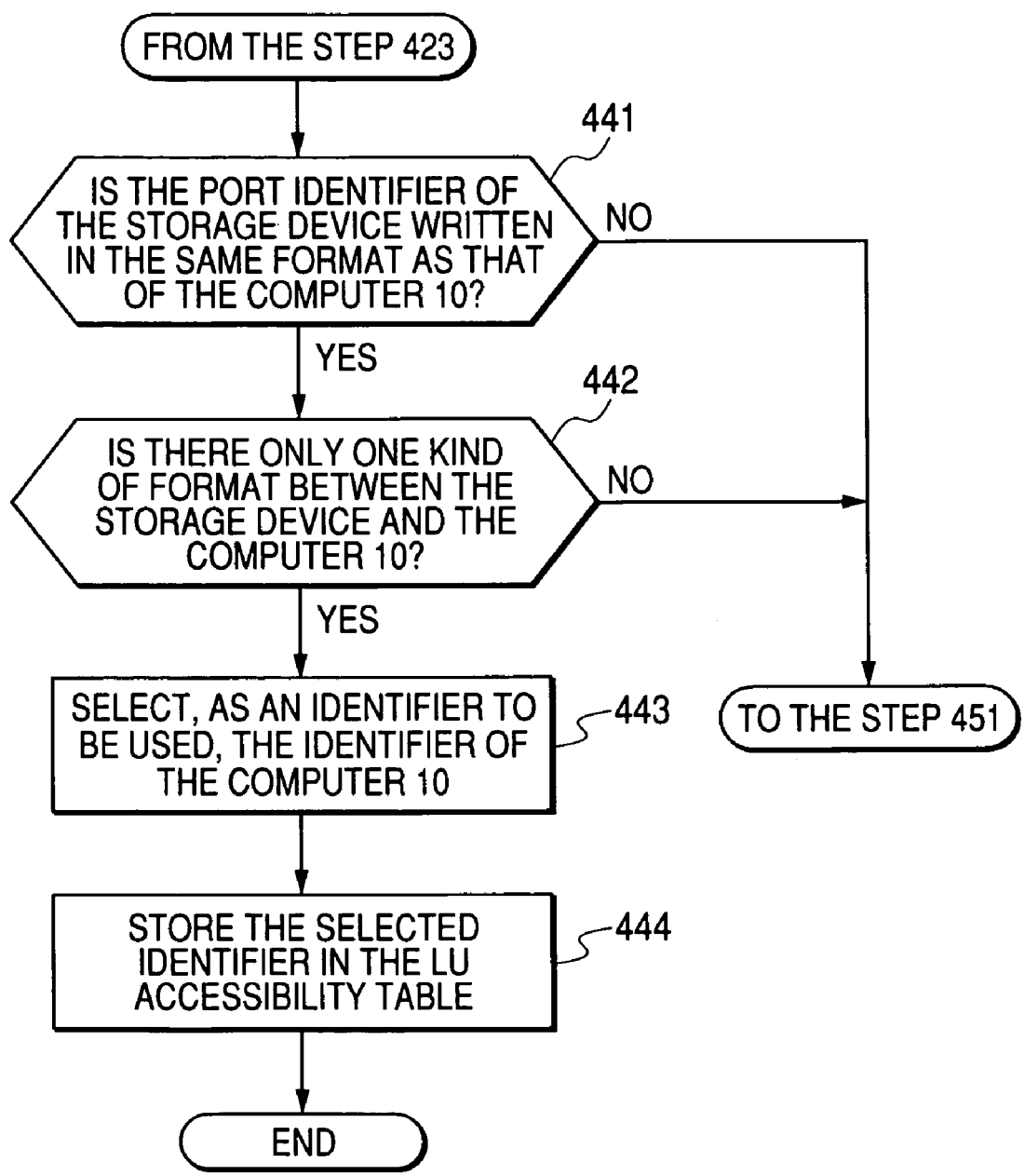
FIG. 21A is a flowchart illustrating processing steps of a third embodiment.
Figure 21B:
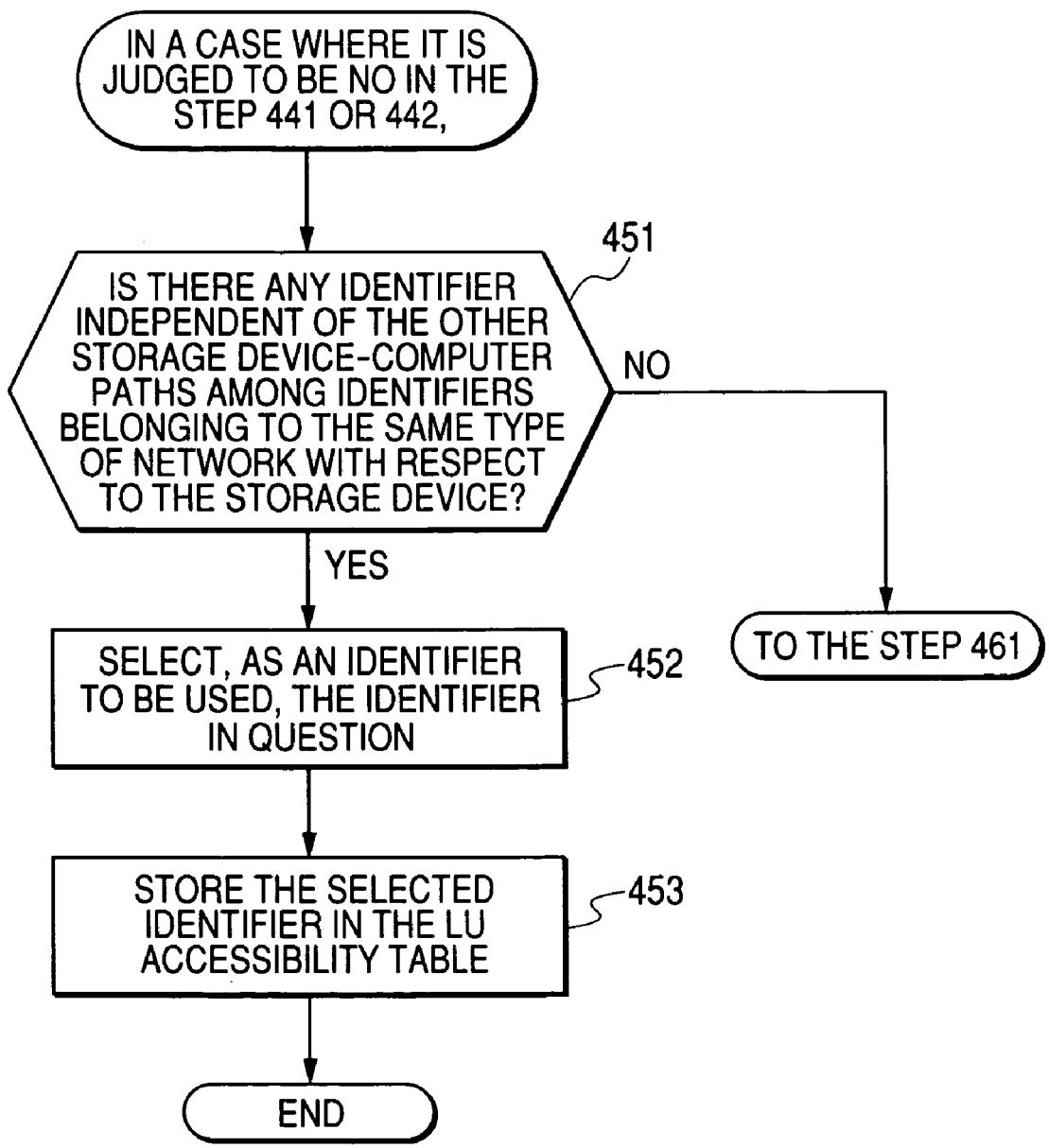
FIG. 21B is a flowchart illustrating processing steps of the third embodiment (continued)
Figure 21C:
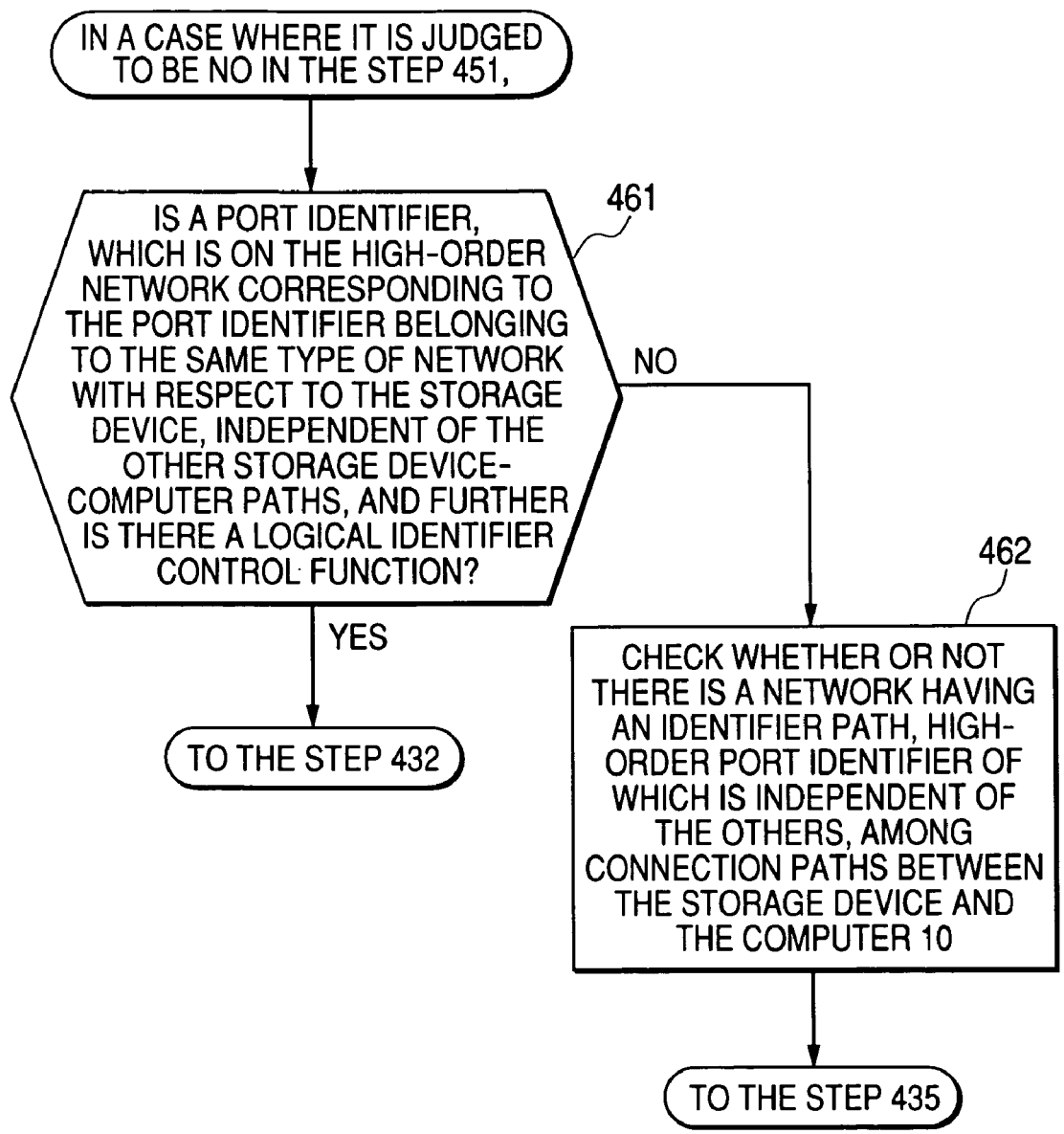
FIG. 21C is a flowchart illustrating processing steps of the third embodiment (continued).

FIGS. 21*a*, 21*b*, and 21*c* are flowcharts illustrating processing steps of the management computer 40 that sets the access limit of an access to a logical unit in the third embodiment. To begin with, a judgment is made as to whether or not a port identifier of the storage device is written in the same data format as that of the computer 10 (step 441). In the configuration example shown in FIG. 20, it is found out that the port identifier of the storage device 20-2 is written in the same format as that of the computer 10-2, and that the port identifier of the storage device 10-2 is written in the same format as that of the computer 10-3.

If it is judged to be Yes in the step 441, then a judgment is made as to whether or not there is only one kind of format between the storage device and the computer 10 (step 442). In the configuration example shown in FIG. 20, only the connection between the storage device 20-2 and the computer 10-3 has only one kind of format.

If it is judged to be Yes in the step 442, this means that the storage device and the computer 10 form the one-to-one or n-to-one connections by use of only the same kind of network. Accordingly, the identifier information of the computer 10 which has been acquired by the identifier acquisition unit 403 is selected, just as it is, as an identifier that is to be stored in the LU accessibility table 207 of the storage device 20 (step 443). In the configuration example shown in FIG. 20, as for the connection between the storage device 20-2 and the computer 10-3, iSCSI8 is selected as an identifier to be stored.

After that, the setting judgment unit 406 calls the setting execution unit 407. The setting execution unit 407 calls the storage information acquisition-and-setting unit 216 through the management network 130 so that the acquired identifier information of the computer 10-3 is stored in the LU accessibility table 207 as a computer identifier (step 444).

If it is judged to be No in the step 441 or 442, the process proceeds to steps shown in FIG. 21B, where the setting judgment unit 406 refers to the result of analyzing the identifier paths, and thereby makes a judgment as to whether or not there is an identifier independent of the other storage device-computer paths among identifiers belonging to the same type of network with respect to the storage device (step 451). In the configuration example shown in FIG. 20, as for the identifier path between the storage device 20-1 and the computer 10-1, WWN8 is judged to be the identifier in question. On the other hand, as for the identifier path between the storage device 20-2 and the computer 10-2, there is no identifier in question.

If there is an identifier in question, this identifier is selected as an identifier that is to be stored in the LU accessibility table 207 of the storage device 20 (step 452).

Nest, the setting judgment unit 406 calls the setting execution unit 407. The setting execution unit 407 calls the storage information acquisition-and-setting unit 216 through the management network 130 so that the selected identifier information is stored in the LU accessibility table 207 as a computer identifier (step 453).

If there is no identifier in question in the step 451, the process proceeds to steps shown in FIG. 21C, where the setting judgment unit 406 makes a judgment as to whether or not a port identifier, a network type of which is the same with respect to the storage device (more specifically, an identifier of a high-order port corresponding to a low-order port of the protocol-conversion-type router 35), is independent of the other storage device-computer paths, and at the same time, whether or not the protocol-conversion-type router 35 has the logical identifier control function as described in the second embodiment (step 461). In the configuration example shown in FIG. 20, as for the connection between the storage device 20-2 and the computer 10-2, the identifier WWN9 corresponding to the identifier iSCSI6 of the protocol-conversion-type router 35-2 is shared by the connection between the storage device 20-1 and the computer 10-1. Accordingly, the identifier WWN9 is not the identifier in question.

If it is judged to be Yes in the step 461, the process proceeds to the step 432, where the setting judgment unit 406 creates a logical identifier in the same format as that of the identifier on the storage device side. Because the processing thereafter is similar to that described in the second embodiment, the description thereof will be omitted.

On the other hand, if it is judged to be No in the step 461, the result of analyzing the identifier path is referred to so as to check higher level identifier paths (the computer 10 side) from a port identifier, a network type of which is the same with respect to the storage device, and then a check is made as to whether or not there is a network having an identifier path, a high-order port identifier of which is independent of the others, among connection paths that certainly connects between the storage device and the computer 10 (step 462). In the configuration example shown in FIG. 20, as for the connection between the storage device 20-2 and the computer 10-2, a part having the identifier relationship which satisfies the above-mentioned conditions is only the operational network 110-2. The processing thereafter is the same as that performed in the case where there is no logical identifier control function in the step 431 of the second embodiment. Accordingly, the description thereof will be omitted.

As a result of the processing steps described above, even if the storage networks include different kinds of networks and has the many-to-many connection relationship, and even if devices for relaying the networks also has the complicated, multistage connection relationship, it becomes possible to set the access limit of an access from the computer to a logical unit in the storage device.

Even in the case of a computer system in which the simple-type router 30 and the protocol-conversion-type router 35 coexist between the computer 10 and the storage device 20, the above-mentioned processing steps of the identifier analyzing unit 405 can be applied to the case just as it is. In other words, the identifier analyzing unit 405 creates an identifier path, that is to say, a sequence of identifiers, from the computer 10 to each storage device 20. Next, the identifier analyzing unit 405 sections the identifier path, that is to say, the sequence of identifiers, from the computer 10 to each storage device 20. If this sequence includes only identifiers in the same format, an identifier which is given to the port of the computer 10 is stored in the LU accessibility table 207 as a computer identifier. If this sequence includes identifiers, formats of which differ from each other, a computer identifier to be stored in the LU accessibility table 207 may be judged according to the processing steps of: the steps 431 through 436; the steps 441 through 444; the steps 451 through 453; or the steps 461 and 462.

What is claimed is:

1. An information setting method executed by a management computer in a computer system in which a first network connects between each of a plurality of computers and a router, a second network connects between the router and a storage device, a network type of the first network differs from that of the second network, and the management computer is connected to each of said computers, said router, and said storage device through a management network, a network identifier being given to each port of said computers and each port of said router, said first network being connected to said each port, a network identifier being also given to each port of said router and each port of said storage device, said second network being connected to each port of said router and each port of said storage device, said information setting method comprising:

acquiring information about the identifiers of the ports, and about the port connection relationship, from said computers and said router;

analyzing the acquired information, and thereby creating a sequence of identifiers that have been given to said ports along an information transmission path from each of said computer to said storage device through the networks; and if said sequence of identifiers is specific to each of said computers on said first network, and is shared among the plurality of computers on said second network, separating said computers from one another in accordance with an identifier of a port on the low-order side of said router, and then creating a logical identifier having an identifier format of said second network;

giving said logical identifier to said storage device in order to separately control each of said computers; and providing said router with said each logical identifier in accordance with each port on the high-order side of said router.

2. An information setting method according to claim 1, wherein:

if instead of being shared among the plurality of computers on said second network, said sequence of identifiers is specific to each of said computers, said information setting method further comprises:

in order to separately control each of said computers, giving said storage device an identifier of a port on the low-order side of said router associated with each of said computers.

3. An information setting method according to claim 2, wherein:

giving the identifier to said storage device, in accordance with said each identifier, gives said storage device an identifier of a logical unit in said storage device, the identifier giving the computer permission to access said logical unit.

4. An information setting method according to claim 1, wherein:

giving said logical identifier to said storage device, in accordance with said each logical identifier, gives said storage device an identifier of a logical unit in said storage device, the identifier giving the computer permission to access said logical unit.

5. An information setting method according to claim 1, further comprising:

if said sequence of identifiers is specific to each of said computers on said first network, and is shared among the plurality of computers on said second network, setting access limit information in said router so that a port on the high-order side of said router may accept only communications with an associated computer.

6. An information setting method according to claim 1, wherein:

said computer system includes a plurality of routers placed in a multistage manner.

7. An information setting method according to claim 1, wherein:

while said management computer is configured as an independent device, the method executed by said management computer is executed by one of said computer, said router, and said storage device.

8. A computer-readable storage medium having a program used in a computer system in which a first network connects between each of a plurality of computers and a router, a second network connects between said router and a storage device, a network type of said first network differs from that of said second network, and a management computer is connected to each of said computers, said router, and said storage device through a management network, said program being executed by said management computer, a network identifier being given to each port of said computers and each port of said router, said first network being connected to said each port, a network identifier being also given to each port of said router and each port of said storage device, said second network being connected to each port of said router and each port of said storage device, said program comprising:

code for acquiring information about the identifiers of the ports, and about the port connection relationship, from said computers and said router;

code for analyzing the acquired information, and thereby creating a sequence of identifiers that have been given to said ports along an information transmission path from each of said computer to said storage device through the networks; and code for, if said sequence of identifiers is specific to each of said computers on said first network, and is shared among the plurality of computers on said second network, separating said computers from one another in accordance with an identifier of a port on the low-order side of said router, and then creating a logical identifier having an identifier format of said second network;

giving said logical identifier to said storage device in order to separately control each of said computers; and providing said router with said each logical identifier in accordance with each port on the high-order side of said router.

9. A computer-readable storage medium according to claim 8, wherein the program further comprises:

code for, if instead of being shared among the plurality of computers on said second network, said sequence of identifiers is specific to each of said computers, giving said storage device an identifier of a port on the low-order side of said router associated with each of said computers in order to separately control each of said computers.

10. A computer-readable storage medium according to claim 9, wherein:

giving the identifier to said storage device gives, in accordance with said each identifier, said storage device an identifier of a logical unit in said storage device, the identifier giving the computer permission to access said logical unit.

11. A computer-readable storage medium according to claim 8, wherein:

giving said logical identifier to said storage device is a function of, in accordance with said each logical identifier, giving said storage device an identifier of a logical unit in said storage device, the identifier giving the computer permission to access said logical unit.

12. A computer-readable storage medium according to claim 8, wherein the program further comprises:

code for, if said sequence of identifiers is specific to each of said computers on said first network, and is shared among the plurality of computers on said second network, providing said router with access limit information so that a port on the high-order side of said router may accept only communications with an associated computer.

13. A computer-readable storage medium according to claim 8, wherein:

said computer system includes a plurality of routers placed in a multistage manner.

14. A management computer used in a computer system in which a first network connects between each of a plurality of computers and a router, a second network connects between said router and a storage device, a network type of said first network differs from that of said second network, and a management computer is connected to each of said computers, said router, and said storage device through a management network, a network identifier being given to each port of said computers and each port of said router, said first network being connected to said each port, a network identifier being also given to each port of said router and each port of said storage device, said second network being connected to each port of said router and each port of said storage device, said management computer comprising:

an information acquisition unit configured to acquire information about the identifiers of the ports, and about the port connection relationship, from said computers and said router;

an identifier analyzing unit configured to analyze the acquired information, and thereby create a sequence of identifiers that have been given to said ports along an information transmission path from each of said computer to said storage device through the network;

a setting judgment unit configured, if said sequence of identifiers is specific to each of said computers on said first network, and is shared among the plurality of computers on said second network, to separate said computers from one another in accordance with an identifier of a port on the low-order side of said router, and then create a logical identifier having an identifier format of said second network; and a setting execution unit configured to give said logical identifier to said storage device, and provide said router with said each logical identifier in accordance with each port on the high-order side of said router, in order to separately control each of said computers.

15. A management computer according to claim 14, wherein:

said setting execution unit gives, in accordance with said each logical identifier, said storage device an identifier of a logical unit in said storage device, the identifier giving the computer permission to access said logical unit.

16. A management computer according to claim 14, wherein:

if instead of being shared among the plurality of computers on said second network, said sequence of identifiers is specific to each of said computers, said setting execution unit gives said storage device an identifier of a port on the low-order side of said router associated with each of said computers in order to separately control each of said computers.

17. A computer system in which at least one router exists between each of a plurality of computers and a storage device, different kinds of operational networks exist between each of said computers and said storage device along an information transmission path from each of said computers to said storage device through said router, and a management computer is connected to each of said computers, said router, and said storage device through a management network, wherein:
- an identifier relating to said operational network is given to each port of said computers, each port of said router, and each port of said storage device, to which said operational network is connected, and a sequence of identifiers, which represents an information transmission path for each of said computers, is such that an identifier path, which is a set of identifiers relating to said operational network between said storage device and said router that is closest to said storage device, is shared among the plurality of computers, whereas a higher level identifier path other than the shared identifier path is specific to each of said computers;
- said management computer first analyzes information about the identifiers of the ports, and about the port connection relationship, acquired from said computers and said router to create said sequence of identifiers from each of said computers to said storage device, and separates said computers from one another in accordance with an identifier of a port on the low-order side of the closest router to create logical identifiers having an identifier format of said operational network included in the shared identifier path, and then transmits said logical identifiers to said storage device in order to separately control each of said computers, and also transmits to said router each of said logical identifiers in accordance with each port on the high-order side of said router;
- said storage device receives said logical identifiers from said management computer, and then stores said logical identifiers in a memory by associating each logical identifier with each of said computers, to which said logical identifier is given; and
- said router receives said logical identifiers from said management computer, and then stores said logical identifiers in a memory by associating each logical identifier with each port on the high-order side.

18. A computer system according to claim 17, wherein:
said management computer transmits to said storage device an identifier of a logical unit in said storage device in accordance with each of said logical identifiers, the identifier giving the computer permission to access said logical unit.

19. A computer system according to claim 17, wherein:
instead of being shared among the plurality of computers, said identifier path between said router and the closest storage device is specific to each of said computers;
said management computer analyzes information about the identifiers of the ports, and about the port connection relationship, acquired from said computers and said router to create said sequence of identifiers from each of said computers to said storage device, and then transmits to said storage device an identifier of a port on the low-order side of said router associated with each of said computers in order to separately control each of said computers; and
said storage device receives the identifiers from said management computer, and then stores the identifiers in the memory by associating each identifier with each of said computers, to which the identifier is given.

20. A computer system in which an IP network connects between each of a plurality of computers and a protocol-conversion-type router, a FC network connects between said protocol-conversion-type router and a storage device, and a management computer is connected to each of said computers, said protocol-conversion-type router, and said storage device through a management network,
- an identifier relating to said IP network being given to each port of said computers and each port of said protocol-conversion-type router, said IP network being connected to said each port, and an identifier relating to said FC network being given to each port of said protocol-conversion-type router and each port of said storage device, said FC network being connected to each port of said protocol-conversion-type router and each port of said storage device,
- said management computer comprising:
- an identifier acquisition unit configured to acquire information about the identifiers of said ports from said computers;
- a router information acquisition unit configured to acquire information about the identifiers of said ports, and about the port connection relationship, from said protocol-conversion-type router;
- an identifier analyzing unit configured to analyze the acquired information, and thereby create a sequence of identifiers, which have been given to said ports, along an information transmission path from each of said computer to said storage device through said IP network and said FC network;
- a setting judgment unit comprising the subunits of:
  - for a computer, said sequence of identifiers of which is independent in both of said IP network and said FC network, judging that an identifier of a port on the low-order side of said protocol-conversion-type router, included in the sequence in question, is to be selected as an identifier of said computer;
  - if said protocol-conversion-type router includes a logical identifier control function, and if said sequence of identifiers is independent of the other computers in said IP network, for a computer that shares said FC network with the plurality of computers, separating said computers sharing said FC network from one another in accordance with an identifier of a port on the low-order side of said protocol-conversion-type router, and then creating a logical identifier having an identifier of said FC network; and
  - if said protocol-conversion-type router does not include a logical identifier control function, and if said sequence of identifiers is independent of the other computers in said IP network, for a computer that shares said FC network with the plurality of computers, judging that the access limit should be established on the protocol-conversion-type router side, and accordingly providing said protocol-conversion-type router with the access limit information; and
- a setting execution unit configured, in order to separately perform the access control of each of said computers, to store the determined identifiers of said computers or the created logical identifiers in a LU accessibility table of said storage device, and set each of said logical identifiers in said protocol-conversion-type router in accordance with each port on the high-order side of said protocol-conversion-type router.

\* \* \* \* \*